United States Patent [19]
Muramatsu et al.

[11] Patent Number: 5,577,256
[45] Date of Patent: Nov. 19, 1996

[54] DATA DRIVEN TYPE INFORMATION PROCESSOR INCLUDING A COMBINED PROGRAM MEMORY AND MEMORY FOR QUEUING OPERAND DATA

[75] Inventors: Tsuyoshi Muramatsu, Chiba; Shinichi Yoshida, Kashihara; Souichi Miyata, Nara, all of Japan

[73] Assignee: Sharp Kabushiki Kaisha, Osaka, Japan

[21] Appl. No.: 53,442

[22] Filed: Apr. 28, 1993

[30] Foreign Application Priority Data

Apr. 28, 1992 [JP] Japan .................................. 4-109694
Jul. 27, 1992 [JP] Japan .................................. 4-199855

[51] Int. Cl.$^6$ .................................................. G06F 15/82
[52] U.S. Cl. .............. 395/800; 364/232.22; 364/DIG. 1; 364/243.3; 395/390; 395/401
[58] Field of Search ................. 395/800, 375, 395/400, 275; 364/DIG. 1, 232.22, DIG. 2; 365/222

[56] References Cited

U.S. PATENT DOCUMENTS

| | | | |
|---|---|---|---|
| 4,907,187 | 3/1990 | Terada et al. | 364/DIG. 2 |
| 4,918,644 | 4/1990 | Terada et al. | 364/DIG. 2 |
| 4,943,916 | 7/1990 | Asano et al. | 364/DIG. 1 |
| 5,021,947 | 6/1991 | Campbell et al. | 364/DIG. 1 |
| 5,072,377 | 12/1991 | Asai et al. | 395/400 |
| 5,117,489 | 5/1992 | Komori et al. | 395/375 |
| 5,165,036 | 11/1992 | Miyata et al. | 395/800 |
| 5,197,137 | 3/1993 | Kumar et al. | 395/375 |
| 5,323,352 | 6/1994 | Miyata et al. | 365/222 |
| 5,327,569 | 7/1994 | Shima et al. | 395/800 |
| 5,361,060 | 11/1994 | Onozaki | 340/825.02 |
| 5,392,405 | 2/1995 | Komatsu et al. | 395/275 |

OTHER PUBLICATIONS

"IEEE MICRO The Data–Driven Microprocessor", Jun. 1989–pp. 45–59.
Komori et al., "A 40–MELOPS 32–Bit Floating–Point Processor With Elastic Pipeline Scheme", IEEE Journal of Solid–State Circuits, Oct. 1989, pp. 1341–1347.
Komori et al., "Data–Driven Microprocessor", IEEE, 1989, pp. 45–59.
Yamasaki et al, "An Implementation of a High–Level Language for a Data–Driven Processor", IEEE, Nov. 1991, pp. 79–84.

*Primary Examiner*—Alyssa H. Bowler
*Assistant Examiner*—Walter D. Davis, Jr.

[57] ABSTRACT

A data driven type information processor includes a control unit having a function of storing a data flow program and accessing it, and a function of producing an operand data pair, the control unit further including one memory shared by both functions. When a program is executed, program data per 1 accessing to the memory and operand data related to the program data are read out simultaneously and applied to an operation unit. Accordingly, a program memory and a memory for queuing operand data, which, were separately provided in a conventional technique, are combined into a single mechanism. Thereby, the number of stages of processing in program execution in the information processor is reduced and increase in program execution speed is permitted.

25 Claims, 24 Drawing Sheets

FIG. 3
|  | PS FIELD | FC FIELD | |
|---|---|---|---|
| POINTER ADDRESS | | | — 20 |
| # 0 | | | |
| # 1 | | | |
| # 2 | | | |
| # 3 | | | |
| # 4 | | | |
| # 5 | | | |
| | | | |
FIG. 4
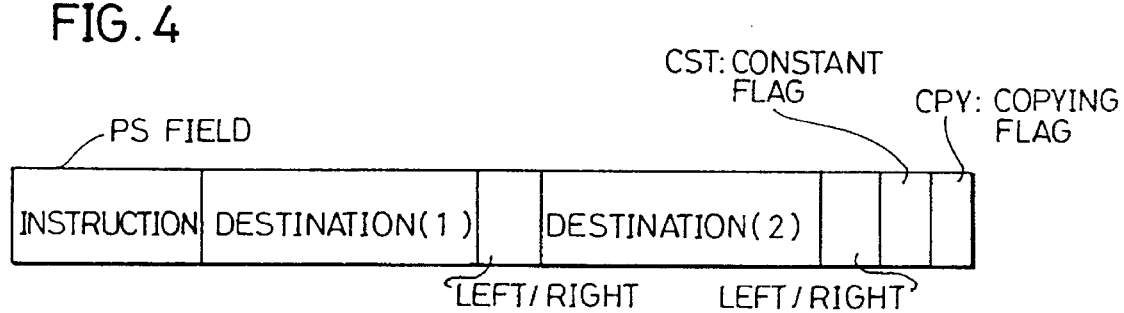
FIG. 5
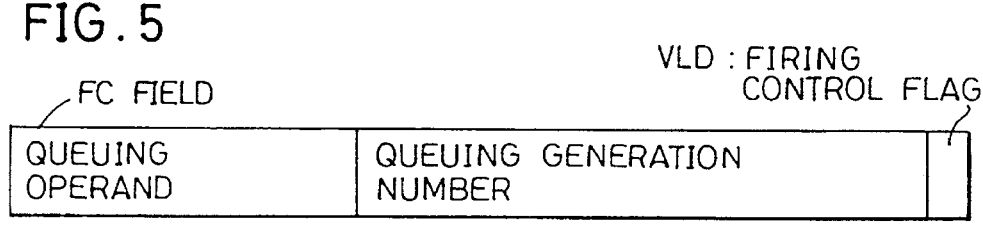

FIG. 9

| POINTER ADDRESS | PS FIELD | | | | | | | FC FIELD | |
|---|---|---|---|---|---|---|---|---|---|
| | INSTRUCTION | DESTINATION(1) | LEFT/RIGHT | DESTINATION(2) | LEFT/RIGHT | COPYING FLAG | CONSTANT FLAG | QUEUING OPERAND | VLD |
| #0 | NOP | #2 | LEFT | #3 | LEFT | 1 | 0 | | |
| #1 | NOP | #2 | RIGHT | #3 | RIGHT | 1 | 0 | | |
| #2 | * | #4 | | #5 | | 1 | 0 | ¥2 | 1/0 |
| #3 | + | #6 | | #7 | | 1 | 0 | ¥3 | 1/0 |
| #4 | INC | #8 | RIGHT | | | 0 | 0 | | |
| #5 | DEC | #9 | LEFT | | | 0 | 0 | | |
| #6 | DEC | #12 | RIGHT | | | 0 | 0 | | |
| #7 | INC | #10 | RIGHT | | | 0 | 0 | | |
| #8 | − | #11 | | | | 0 | 0 | K$_1$ | |
| #9 | + | #12 | LEFT | | | 0 | 1 | K$_2$ | |
| #10 | * | #13 | | | | 0 | 1 | K$_3$ | |
| #11 | ABS | $11 | $11 | | | 0 | 0 | | |
| #12 | * | $12 | $12 | | | 0 | 0 | ¥12 | 1/0 |
| #13 | ABS | $13 | $13 | | | 0 | 0 | | |

FIG. 12

| POINTER ADDRESS | PS FIELD ||||| INSTRUCTION (2) | DESTINATION (2) | LEFT/RIGHT | CONSTANT FLAG ||| FC FIELD ||
|---|---|---|---|---|---|---|---|---|---|---|---|---|---|
| | INSTRUCTION (1) | DESTINATION (1) | LEFT/RIGHT | | | | | | COPYING FLAG | | QUEUING OPERAND | VLD |
| #0 | ∗ | #1 | | | | + | #2 | | 1 | 0 | K0 | 1/0 |
| #1 | INC | #3 | RIGHT | | | DEC | #4 | LEFT | 1 | 0 | | |
| #2 | DEC | #7 | RIGHT | | | INC | #5 | RIGHT | 1 | 0 | | |
| #3 | — | #6 | | | | | | | 0 | 1 | K1 | |
| #4 | + | #7 | LEFT | | | | | | 0 | 1 | K2 | |
| #5 | ∗ | #8 | | | | | | | 0 | 1 | K3 | |
| #6 | ABS | $6 | S16 | | | | | | 0 | 0 | K7 | 1/0 |
| #7 | ∗ | $7 | S17 | | | | | | 0 | 0 | | |
| #8 | ABS | $8 | S18 | | | | | | 0 | 0 | | |

FIG. 15

| ITEM / MODULE | BINOMINAL OPERATION INSTRUCTION NODE NUMBER | MONOMINAL OPERATION INSTRUCTION NODE NUMBER | NUMBER OF DESTINATION ARCS | OBJECT SIZE | NUMBER OF REGIONS USED FOR QUEUING |
|---|---|---|---|---|---|
| FIG. 9 MODULE | 6 | 6 | 12 | 24 | 5 |
| FIG. 12 MODULE | 6 | 8 | 18 | 32 | 6 |
| FIG. 31A MODULE | 12 | 6 | 18 | 36 | 3 |

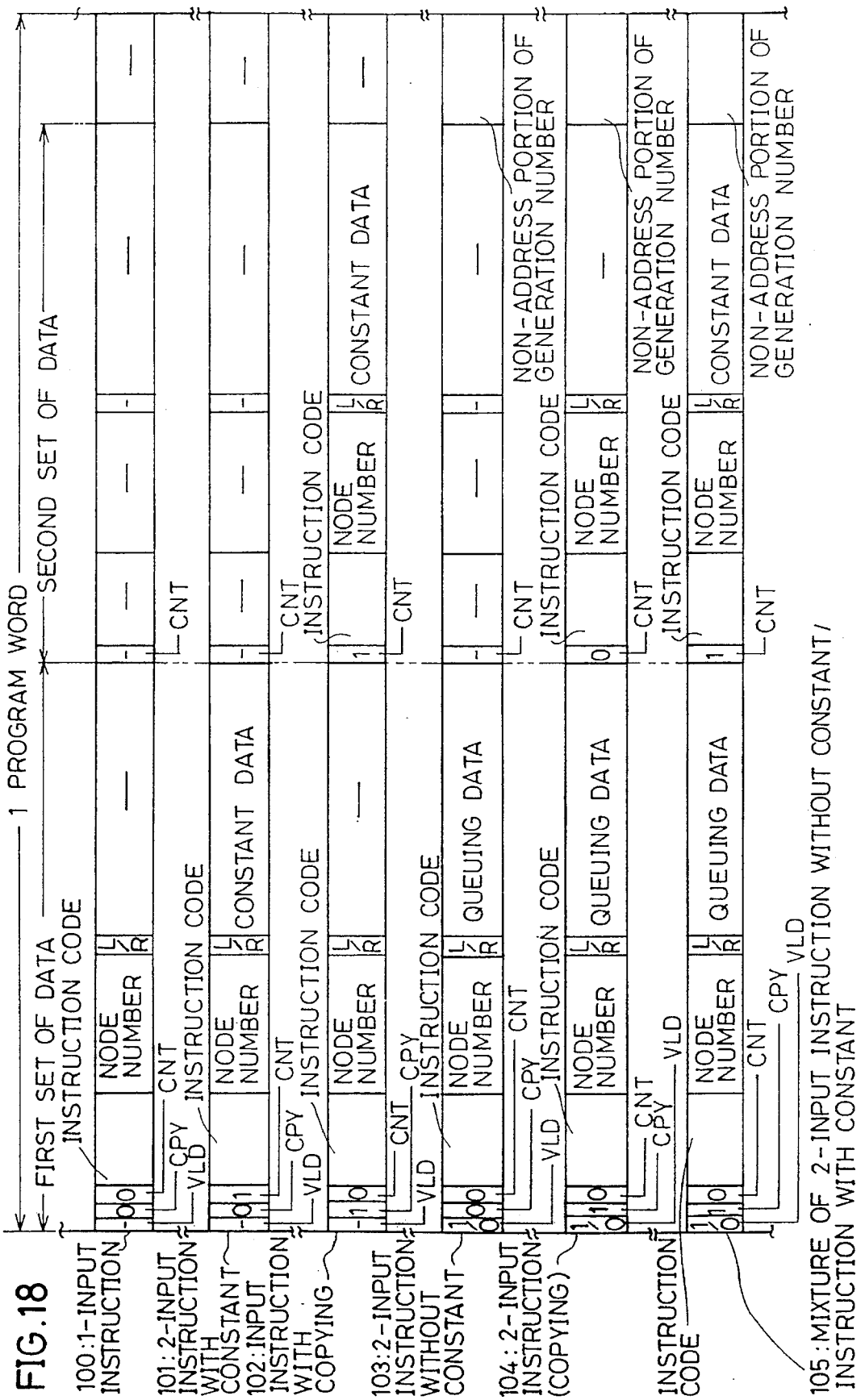

FIG. 19A   ADDRESS FOR ACCESSING FCP MEMORY = NODE NUMBER + GENERATION NUMBER
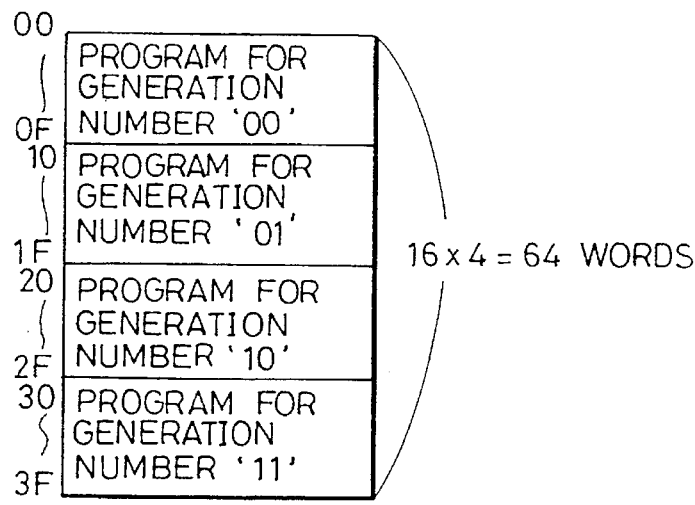
FIG. 19B   ADDRESS FOR ACCESSING FCP MEMORY = NODE NUMBER + ADDRESS PORTION OF GENERATION NUMBER
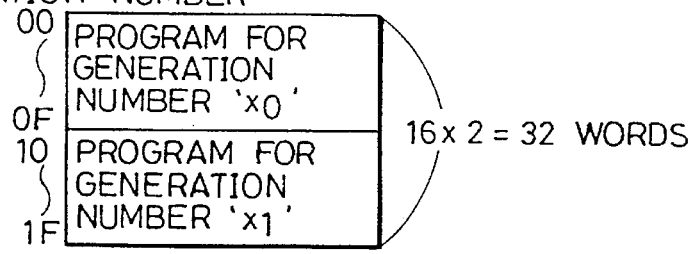
FIG. 19C   ADDRESS FOR ACCESSING FCP MEMORY = NODE NUMBER
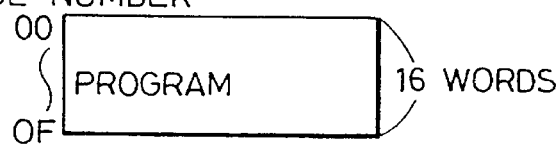
FIG. 20
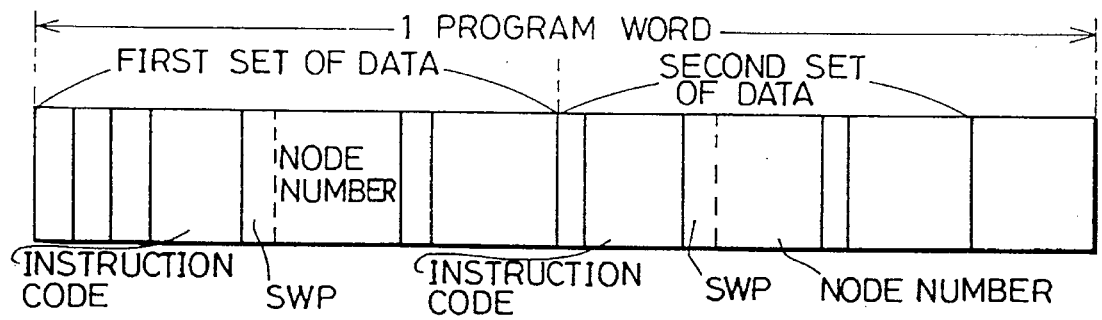

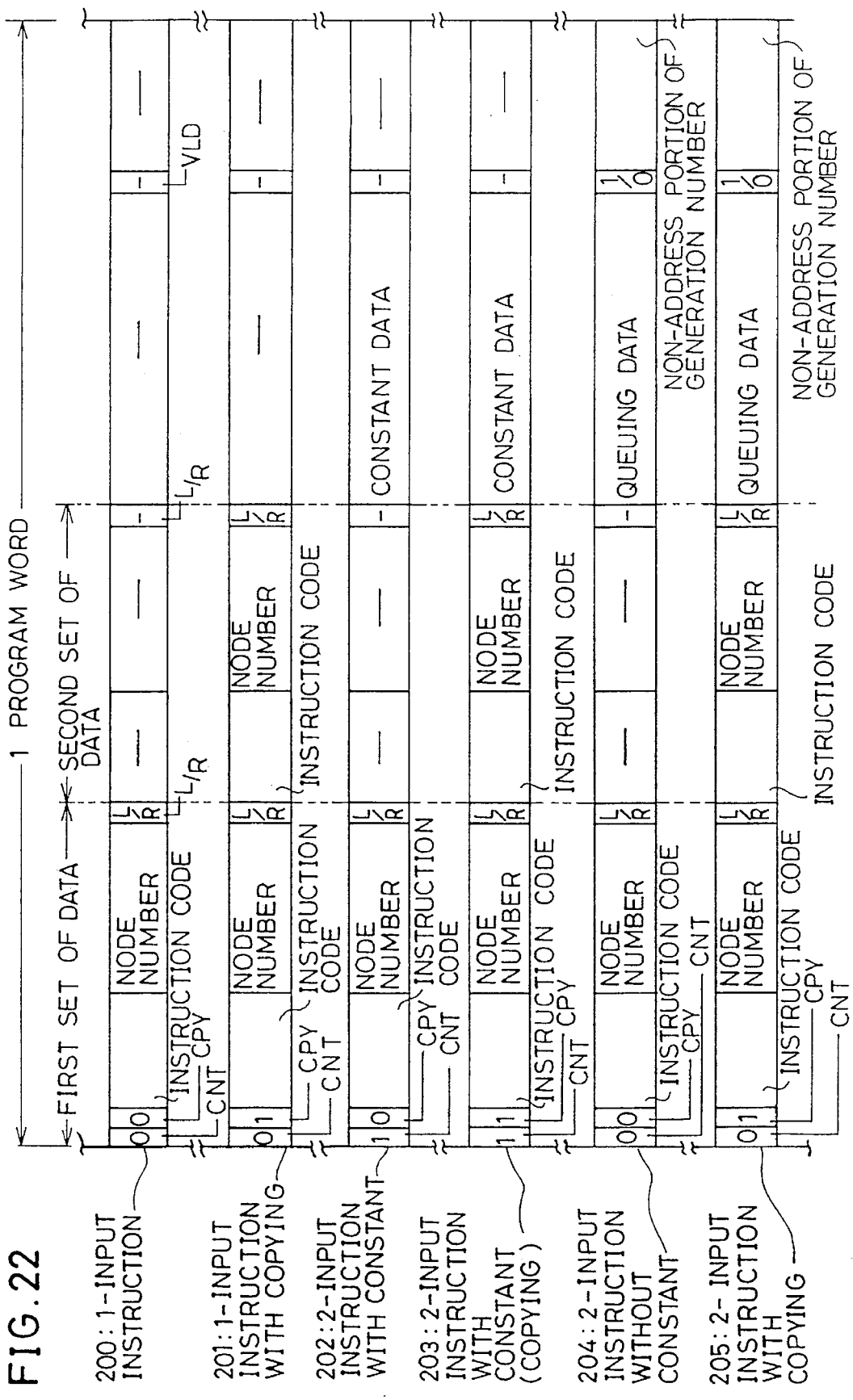

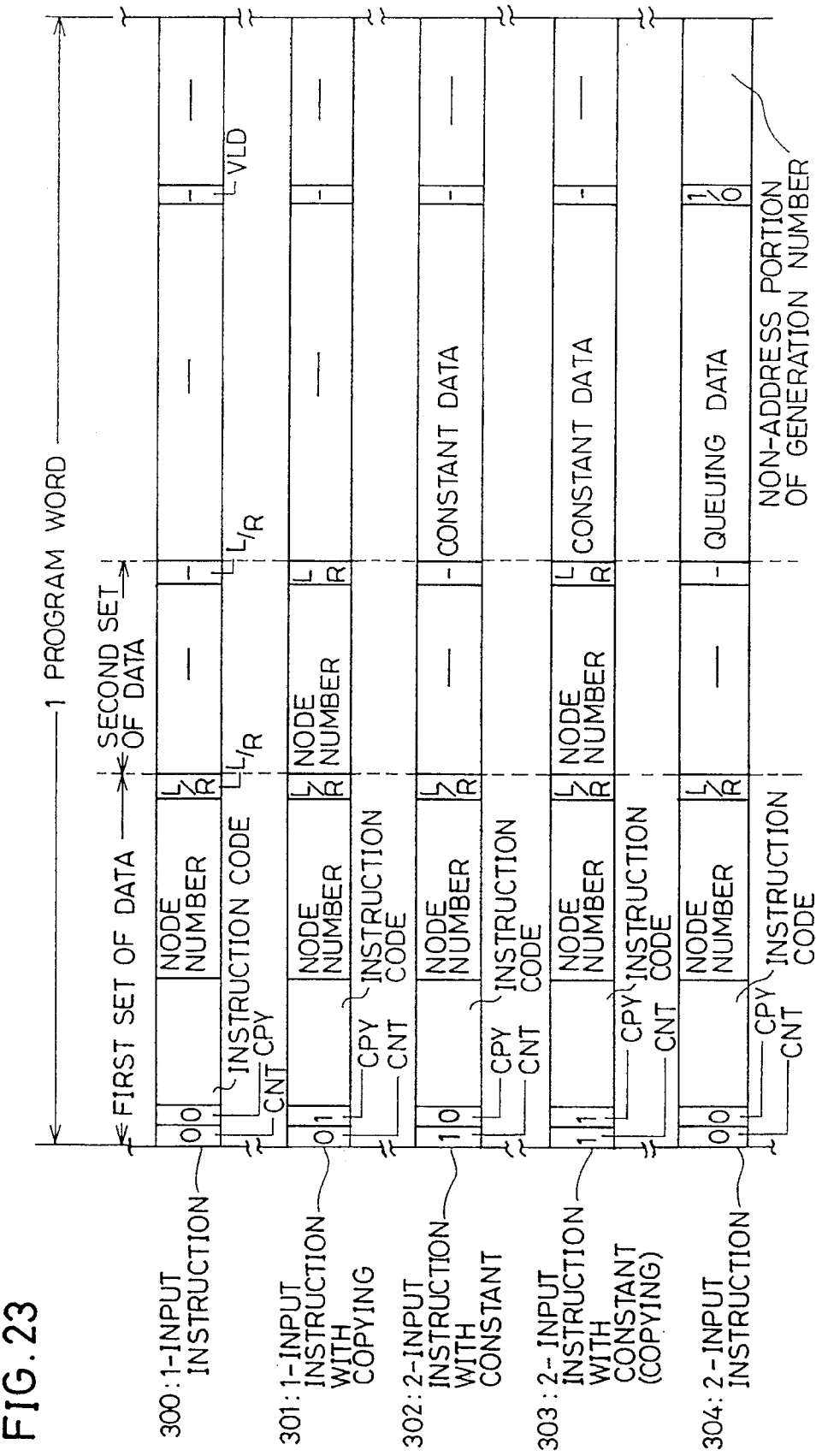

CONTENT OF PROGRAM MEMORY — CONSTANT DESTINATION COPYING

| POINTER ADDRESS | INSTRUCTION | | LEFT/RIGHT | | |
|---|---|---|---|---|---|
| #0 | * | #4 | LEFT | 1 | 0 |
|  | + | #6 | LEFT |  |  |
| #2 | * | #4 | RIGHT | 1 | 0 |
|  | + | #6 | RIGHT |  |  |
| #4 | INC | #8 |  | 1 | 0 |
|  | DEC | #10 |  |  |  |
| #6 | DEC | #12 |  | 1 | 0 |
|  | INC | #13 |  |  |  |
| #8 | − | #15 | RIGHT | 0 | 1 |
|  | K$_1$ |  | LEFT |  |  |
| #10 | + | #16 | LEFT | 0 | 1 |
|  | K$_2$ |  | RIGHT |  |  |
| #12 | * | #19 | RIGHT | 0 | 0 |
| #13 | * | #17 | RIGHT | 0 | 1 |
|  | K$_3$ |  | LEFT |  |  |
| #15 | ABS | #18 |  |  |  |
| #16 | * | #19 | LEFT |  |  |
| #17 | ABS | #20 |  |  |  |
| #18 | $18 | $18 | $18 | $18 | $18 |

FIG. 31B PRIOR ART

CONTENT OF FC QUEUING MEMORY — VLD

| POINTER ADDRESS | QUEUING OPERAND | |
|---|---|---|
|  |  |  |
|  |  |  |
|  |  |  |
|  |  |  |
| #4 | ¥4 | 1/0 |
|  |  |  |
| #6 | ¥6 | 1/0 |
|  |  |  |
|  |  |  |
|  |  |  |
|  |  |  |
|  |  |  |
| #12 | ¥12 | 1/0 |
|  |  |  |
|  |  |  |
| (#15) | (¥15) |  |
| (#16) | (¥16) |  |
| (#17) | (¥17) |  |
|  |  |  |

DATA DRIVEN TYPE INFORMATION PROCESSOR INCLUDING A COMBINED PROGRAM MEMORY AND MEMORY FOR QUEUING OPERAND DATA

BACKGROUND OF THE INVENTION

1. Field of the Invention

The present invention relates to data driven type information processors.

2. Description of the Background Art

In a conventional von Neuman computer, various instructions are stored in advance in a program memory as a program, and addresses in the program memory are sequentially addressed by a program counter so that the instructions are sequentially read out, whereafter the instructions are executed.

Meanwhile, a data driven type information processor is one type of non-von Neuman computers which does not have a concept of such execution of sequential instructions by a program counter. Such a data driven type information processor employs architecture based on parallel processing of instructions. In the data driven type information processor, a collection of data to be operated permits execution of an instruction, and a plurality of instructions are driven by the data at one time. Thus, the program is executed in a parallel manner in accordance with the natural flow of the data. As a result, it is considered that time required for such operation is greatly reduced.

FIG. 26 is a block diagram showing one example of a conventional data driven type information processor.

FIGS. 27A and 27B are representations, each showing the field structure of a data packet in the data driven type information processor shown in FIG. 26.

FIG. 28 is a representation schematically showing tools to aid a user in developing a data flow program and a developing procedure.

A data packet PA in FIG. 27A includes a generation field F1, a destination field F2, an instruction field F3, and a data field F4. A data packet Pa in FIG. 27B includes, in addition to fields F1 to F4, a data field F5. A generation number is stored in generation field F1, destination information is stored in destination field F2, instruction information is stored in instruction field F3, and operand data (including constant data) is stored in data field F4 or F5.

A data driven type information processor in FIG. 26 includes an input/output control unit QJB, a program storage unit PS, a firing control unit FC including a queuing memory, and an operation unit FP. Input/output control unit QJB includes a branching/allocating function of dividing the destination of the data packet for output. Program storage unit PS includes a memory capable of storing a data flow program formed of the plurality of destination information and instruction information, and of high speed accessing. Firing control unit FC includes a queuing memory to keep one data packet waiting according to a priority order based on generation numbers until two different data packets PA to be operated in response to a binomial operation instruction are collected. Firing control unit FC has a function of forming the two data packets into one data packet Pa and sending the same to operation unit FP as soon as these two data packets are collected (hereinafter referred to as firing). Operation unit FP has arithmetic operation and logic operation functions.

Now, an operation when a data flow program is executed will be described. It is assumed that various data necessary for executing a data flow program and a program to be executed are stored in advance in memories or registers (not shown) in program storage unit PS and input/output control unit QJB.

The data packet PA is input to input/output control unit QJB through a terminal IN in FIG. 26, and control unit QJB selectively transmits the input packet PA to one of program storage unit PS and a terminal OUT based on the destination information of the input packet PA. Program storage unit PS reads next order destination information, next order instruction information and the like from the data flow program by addressing based on the destination information of the input data packet PA. The read out next order destination information and next order instruction information are stored in the destination field F2 and instruction field F3, respectively of the input data packet PA, and the input data packet is provided to firing control unit FC. Firing control unit FC accesses the queuing memory by addressing based on the destination information and generation number of the input data packet and detects a firing. More specifically, if queuing data is stored in the addressing region of the queuing memory, a firing takes place according to a priority order based on a comparison result between a queuing generation number stored in the addressing region and the generation number of the input data packet PA. Conversely, if queuing data is not stored in the addressing region, the operand data and the non-offset field of the generation number of the input data packet PA are written in the addressing region, thus queuing for a data packet PA. The non-offset field of a generation number indicates the portion of data representing the generation number which is not used for addressing a queuing memory. When firing control unit FC detects two different data packets PA whose designation information and generation number match one another, the operand data of one data packet, the content of data field F4 in FIG. 27A, for example, is stored in data field F5 in FIG. 27B, and the data packet Pa is provided to operation unit FP.

Operation unit FP operates destination information based on the instruction information of the data packet Pa output from firing control unit FC or operates the operand data, stores the operation result in the data field F4 of the data packet PA and sends out the packet. The data packet PA sent from operation unit FP is provided to input/output control unit QJB, and is selectively sent to one of program storage unit PS and terminal OUT based on its destination information. When the data packet PA is sent out to program storage unit PS, the next instruction is read similarly to the above-described manner.

As stated above, as the data packet PA circulates in the order of program unit PS→firing control unit FC→operation unit FP→program storage unit PS, a processing based on a data flow program stored in the data driven type information processor proceeds.

The above-described data flow program is developed via a procedure including a text editor, a compiler or an assembler, a linker and a mapper prepared in software in FIG. 28. The text editor is an editor for producing a data flow program according to C language. An edited data flow program is stored in a source file so that it can be processed by the compiler or the assembler. The compiler reads the source file, analyzes and develops the data flow in a flow graph (intermediate type file). Meanwhile, the assembler can describe in a manner closer to the flow graph and develops the data flow in a flow graph (intermediate type file) as is the case with the compiler. The linker combines these flow graphs. The combined flow graph is developed in an executable form (object module) through the mapper. The object module is down-loaded to a target system such as the data driven type information processor shown in FIG. 26 or a software simulator in a data packet PA, stored in program storage unit PS or firing control unit FC, and then executed as a program.

FIG. 29 illustrates one example of a calculation program.

FIG. 30 shows a data flow graph obtained from the program in FIG. 29.

FIGS. 31A and 31B each show a storage content when an object module obtained from the data flow graph in FIG. 30 is stored in the program storage unit PS or the queuing memory of firing control unit FC. In FIGS. 31A and 32A, a slanted line means "not used", a "¥" means queuing operand data value; "$" means valid operation or destination data value; and "VDL" means firing control flag.

The program shown in FIG. 29 can be described in about the same manner as C language from a grammatical point of view. When this is subjected to a data flow analysis according to the procedure shown in FIG. 28, the data flow graph shown in FIG. 30 is obtained. When this is loaded to a target system as an object module, program data as shown in FIG. 31A is stored in the program memory of program storage unit PS, and constant data necessary for program execution processing is stored as well. The queuing memory of firing control unit FC has a physical address space corresponding to the program memory.

Pentagon and ellipse symbols in the data flow graph in FIG. 30 are called nodes, and input data and operation instructions are allocated thereto. A line connecting a node is called an arc. When the program in FIG. 29 is flow-analyzed, the nodes are provided with node numbers #0–#20 as shown in FIG. 30. A node number represents destination information, while an operation instruction represents instruction information. Of operation instructions, NOP indicates a no operation preserving an input for output without doing anything, * indicates multiplication, + indicates addition, INC indicates incrementing the value of input data by 1, DC indicates decrementing the value of input data by 1, − indicates subtraction, and ABS indicates an operation processing to produce an absolute value.

The program memory Of program storage unit PS in FIG. 31A has a space corresponding to an address pointed (addressed) by the destination information of an input data packet PA (hereinafter referred to as pointer address), and stores an instruction, a destination, a left/right flag, a copy flag or a constant flag for each pointer address. The instruction represents instruction information (operation instruction), the destination represents next order destination information (next order node number), the left/right flag represents either left input or right input corresponding destination information, in other words the instruction of the next order node number. At the time of reading from program storage unit PS, the left/right flag is stored in destination field F2.

In a data flow program, a copy of data is sometimes necessary as illustrated in FIG. 30. If, for example, the output of node number #0 or node number #2 is operand data of two or more operation instructions, e.g. operand data of multiplication and addition instructions of node number #4 and #6, a copying processing will be necessary. The copying processing is performed in program storage unit PS. When the instruction of a node number which requires a copying processing is executed in FIG. 30, the copy flag is set to "1" so that the next address is designated following a corresponding pointer address in FIG. 31A and data is sequentially read out. Accordingly, the copy flag is set (="1") in the pointer address #0 in FIG. 31A, and when the pointer address #0 is designated, information stored in the address #0 is read out followed by reading of information stored in the next address #0. By this copying processing, for the two nodes of node numbers #4 and #6 linked in parallel to the node of node number #0, its left input data is obtained at the same time.

In a data flow program, when constant data is described as illustrated in FIG. 30, in other words when the operand data of nodes of node numbers #15, #16, and #17 are constants K1, K2, and K3, respectively, as shown in FIG. 31A constant flags are set in response to corresponding pointer addresses.

The queuing memory of firing control unit FC in FIG. 31B stores a queuing operand and a firing control flag VLD corresponding to each pointer address. The firing control flag VLD is set to "1" when a corresponding queuing operand is stored in a queuing state (non-firing), and otherwise to "0".

Now, an operation of executing the program shown in FIG. 29 in the data driven type information processor shown in FIG. 26 will be described in conjunction with FIGS. 26 to 31. It is noted that description will not be provided on priority order determination for firing in firing control unit FC according to generation numbers for ease of description.

Data packets a1 and b1 in FIG. 30 are provided to the data driven type information processor. The data packet a1 stores NOP for instruction information, node number #0 for destination information, "g" for generation number, and "a" for operand data. The data packet b1 stores NOP for instruction information, node number #2 for destination information, "g" for generation number, and "b" for operand data.

The data packets a1 and b1 are provided to program storage unit PS via the input/output control unit QJB of the data driven type information processor shown in FIG. 26. Program storage unit PS reads the instruction *, the destination #4, and the left flag stored in the pointer address #0 in FIG. 31A by addressing based on the destination information #0 in the input data packet, and stores them in the instruction field F3 and destination field F2 of the input data packet a1, respectively and outputs the data packet a1 to firing control unit FC. At that time, since a corresponding copying flag is set in the pointer address, the instruction +, the destination #6, and the left flag stored sequentially in the pointer address #1 are read out to be stored in prescribed fields of a data packet PA which stores "a" for operand data, and the packet PA is output to firing control unit FC.

Similarly, program storage unit PS reads out instruction *, destination #4, and right flag stored in the pointer address #2 in FIG. 31A by addressing based on the destination information #2 of the input data packet b1 and stores them in the instruction field F3 and destination field F2 of the input data packet b1, and the packet b1 is output to firing control unit FC. At that time, since a corresponding copying flag is set in the pointer address, instruction +, destination #6 and right flag stored in the next pointer address #3 are sequentially read out, each stored in a prescribed field of a data packet PA storing "b" for operand data, and the packet PA is output to firing control unit FC.

Firing control unit FC sequentially inputs a data packet provided from program storage unit PS, addresses a queuing memory in FIG. 31B based on its destination information (node number) and generation number, in response to instruction information of the input data packet being a binominal operation instruction, writes the operand data of the input data packet in a region corresponding to a corresponding pointer address, and sets a corresponding firing control flag VLD, and the written data queues until a data packet storing operand data to be paired therewith is input. When a data packet storing operand data to be paired with the input data packet is input, a firing in each of the nodes of node numbers #4 and #6 in FIG. 30 is detected in the pointer addresses #4 and #6 in FIG. 31B, and a data packet Pa storing the operand data pair is sequentially sent to the next operation unit FP. After the firing detection, the firing control flag VLD corresponding to the pointer address is reset. In operation unit FP, the operand data pair is subjected to an operation according to instruction information stored in the input data packet Pa, and the result of the operation is stored in the field F4 of a data packet PA and the packet PA is output. Thus, the operation instructions of node numbers #4 and #6 in FIG. 30 are executed, and a data packet storing an operation result x in its field F4 and a data packet storing an operation result y in its field F4, respectively are sequentially provided to program storage unit PS.

Program storage unit PS accesses the program memory shown in FIG. 31A and reads the next instruction in the same manner as described above by addressing based on the destination information of the data packets storing the operation result. More specifically, in response to input of the data packet storing the operation result x, an instruction INC and a destination #8 stored in the pointer address #4 in FIG. 31A are read out, while in response to a corresponding copying flag being set, an instruction DEC and a destination #10 stored in the pointer address #5 are sequentially read out. The read out information are each stored in the data packets storing operand data "x", and the data packets are sequentially sent out to firing control unit FC. In response to input of the data packet storing the operation result "y", an instruction DEC and a destination #12 stored in the pointer address #6 are read out, while in response to a corresponding copying flag being set, an instruction INC and a destination #13 stored in the pointer address #7 are read out. The read out information are each stored in the data packets storing operand data "y" as in the case of the previous example, and the data packets are sent to firing control unit FC. Firing control unit FC responds to the instruction information DEC or INC Of the data packet provided from program storage unit PS being a monominal operation instruction and provides the input data packet to operation unit FP without performing any processing. Operation unit FP performs an operation to the operand data stored therein according to the instruction information of the data packet provided from firing control unit FC, and sends out the data packet storing the operation result to program storage unit PS. At that time, operations corresponding to nodes numbers #8, #10, #12 and #13 in FIG. 30 are performed. Accordingly, four data packets storing x+1, x−1, y−1, and y+1 in their data fields F4, respectively are sequentially sent out to program storage unit PS.

Program storage unit PS sequentially accesses the pointer addresses #8, #10, #12, and #13 in FIG. 31A by addressing based on the destination information (node numbers) of the data packets storing the results of operations, reads information stored therein, and data packets storing the read out information are output to control unit FC. At that time, in response to a corresponding constant flag being set, another set of the read out information described above is produced. Further, constant data stored in the next pointer addresses #9, #11, and #14 is sequentially read out, and data packets storing the read out information are sent out to firing control unit FC. In firing control unit FC, queuing for data is not performed, since it is a constant operation, an operand data pair is produced from the sequentially input data packets and sent to operation unit FP. Thus, in operation unit FP, operation instructions with constants in node numbers #15, #16 and #17 in FIG. 30 are sequentially executed.

Similarly, thereafter, packets circulate program storage unit PS, firing control unit FC and operation unit FP, operations in node numbers #18, #19, and #20 in FIG. 30 are executed, and the operation results v, t, and s are obtained.

As described above, the circulation of data from program storage unit PS→firing control unit FC→operation unit FP→program storage unit PS→ . . . permits the program shown in FIG. 29 stored in program storage unit PS to be executed.

In order to process data of a packet type, the above-described data driven type information processor requires as program data, in addition to "instruction" data in a conventional von Neuman processor, "destination" data, "generation number" data, and "operand (including constants) data". Therefore, in the data driven type information processor, redundant object data as compared to a von Neuman information processor will be produced. Due to miniaturization technology limitations in the manufacture of ICs (Integrated Circuits), however, a one-chip IC memory having the functions and capacities of the program memory of the program storage unit and the queuing memory of the firing control unit cannot be obtained. Therefore, the program storage function of storing object data and the queuing memory function for queuing data to be paired with are implemented by separate IC memories.

As described above, separate memories are necessary for the program storage unit and the firing control unit and an address/decoder, a reading circuit, a writing circuit and the like should be provided for each memory, which means that necessary memory peripheral circuitry must be doubled. This makes it difficult to reduce the size of the data driven type information processor. Furthermore, the doubled memory peripheral circuitry excessively increases the number of! processing stages excessively which gives rise to the increase of program execution time.

In the above-described conventional method of controlling data flow program execution, the identification number of an execution instruction is allocated separately to each instruction node on a data flow graph by the compiler. Therefore, different destination node numbers must be allocated to two operand data per one binominal operation, and the size of the object module becomes redundant, which further increases program execution time.

FIG. 32 is a block diagram showing another example of a conventional data driven type information processor.

FIG. 33 is a representation showing the field structure of a data packet circulating through the data driven type information processor shown in FIG. 32.

In FIG. 33, a data packet P is formed of a first word and a second word. The first word includes a flag field f1, an instruction field f2, a generation number field f3, a node number field f4, and an identification code field f5. The second word includes a left data field f6, and a right data field f7. A through flag SF which will be described later is stored in field f1, an instruction code in field f2, a generation number of an address portion and a non-address portion in field f3, and a node number in field f4. A left/right identification code L/R is stored in field f5. Left operand data is stored in field f6, and right operand data is stored in field f7. Data related to the instruction code stored in the field f2 of the packet P is stored in fields f6 and f7. If the instruction code is a binominal operation instruction requiring the right and left operand data, the left operand data and right operand data related to the instruction code are stored in fields f6 and f7, respectively. Meanwhile, if the instruction code in field f2 is a monominal operation instruction utilizing one operand data, that one operand data related to the instruction code is stored only in field f6. The address portion and non-address portion of the generation number, and the left/right identification code L/R will be later described more in detail.

Data driven type information processor 30 in FIG. 32 includes an operation portion 2, a branch portion 3, a junction portion 4, a program storage unit 5 and a firing control unit 6.

FIG. 34 is a representation showing part of the storage content of program storage unit 5 in FIG. 32.

FIG. 35 is a representation showing part of the storage content of the queuing memory of firing control unit 6 shown in FIG. 32.

FIG. 36 is a block diagram showing a program reading mechanism in the program storage unit shown in FIG. 32.

A data flow program as shown in FIG. 34 is stored in advance in program storage unit 5 shown in FIG. 32. Referring to FIG. 34, the data flow program includes a plurality of stored sets of copy flags CPY, constant flags CNT, next order instruction codes, next order node numbers, and left/right identification codes L/R. Program storage unit 5 fetches (reads out) the next order instruction code and the next order node number from the data flow program by addressing based on the node number of an input packets P. The instructions stored in program storage unit 5 are classified into three kinds of instructions, "usual instruction", "instruction with, packet copying", and "instruction with constant data". The structure of an output packet from program storage unit 1 is the same as the structure of the data packet P shown in FIG. 33.

When program storage unit 5 fetches the "usual instruction" by addressing based on a node number stored in the input packet, the fetched instruction code, node number, and flag L/R are stored in the fields f2, f4, and f5 of the input packet, respectively and outputs the input packet.

When program storage unit 5 fetches "instruction with packet copying" by addressing based on a node stored in an input packet, the same processing as the above "usual instruction" is performed, and then the content of a corresponding region in the next address is sequentially fetched, in response to the copying flag CPY stored in the addressing region being "1". As in the case of the "usual instruction", the fetched next order instruction code, next order node number, and identification code L/R are stored in the fields f2, f4 and f5 of the input packet and the packet is output. Thus, if the "instruction with packet copying" is fetched in program storage unit 5, generally, two packets storing different instruction codes, node numbers and left/right identification codes L/R are output from program storage unit 5.

When program storage unit 5 fetches the "instruction with constant data" by addressing based on a node number stored in an input packet, the same processing as the above "usual instruction" is performed, and then the content of a region corresponding to the next address is sequentially fetched in response to the constant flag CNT stored in the addressing region being 1. The fetched content is constant data. After the fetched constant data are written in the fields f6 or f7 of the input packet, the code L/R of the input packet is inverted, and the packet is output. Thus, in program storage unit 5, when the "instruction with constant data" is fetched, generally, two data packets storing different data and identification codes L/R are output from program storage unit 5 for one input packet.

In FIG. 32, firing control unit 6 queues for a data packet output from program storage unit 5, in other words detects two different data packets having the same generation number and node number, and produces a data pair. Part of the storage content of the essential element of firing control unit 6, a queuing memory (not shown in FIG. 32) is shown in FIG. 35. In FIG. 35, the queuing memory is addressed based on the node number and the address portion of the generation number stored in the input packet from program storage unit 5. The non-address portion of the generation number, the queuing data, and the firing control flag VLD are stored in regions which can be addressed.

When an instruction code stored in an input packet represents a one-input instruction requiring only one operand, firing control unit 6 outputs the input packet without performing any processing. Meanwhile, if the instruction code of the input packet is a 2-input instruction requiring two operands, the queuing memory is accessed by addressing based on the node number and the address portion of the generation number of the input packet. If the flag VLD stored in the addressing region of the input packet indicates 0, data stored in the field f6 or f7 of the input packet is written in the addressing region as queuing data, and the non-address portion of the generation number of the input packet is written in a similar manner. Then, the flag VLD of the addressing region is set to "1". In this case, firing control unit 6 does not output a packet.

When the flag VLD stored in the addressing region of the queuing memory indicates "1", it is detected whether or not the non-address portion of the generation number of the input packet is in agreement with the non-address portion of the generation number written in the addressing region. If a coincidence is detected, a data pair is produced from data stored in the field f6 or f7 of the input packet and data read out from the addressing region, and a data packet storing the produced data pair is output. At the time, the data to be stored in the fields f6 and f7 of the output packet is decided as follows. When the identification code L/R of the input packet is "L", data in the input packet is set to the left operand data of the output packet and queuing data read out from the queuing memory to the right operand data of the output packet. Meanwhile, if identification code L/R is a code "R", the set content of the left/right operand data of the output packet is reversed from the above case in which the code L/R of the input packet is "L". The instruction code, generation number and node number of the input packet are directly set in the fields f2, f3, and f4 of the output packet. At that time, the flag VLD stored in the addressing region of the queuing memory is set to "0".

When the flag VLD stored in the addressing region of the queuing memory is "1", and the non-address portion of the generation number stored in the input packet does not coincide with the non-address portion of the generation number of the addressing region, the through flag SF of the input packet is set to "1" and the input packet is output as it is.

The through flag SF in the data packet P is usually set to "0", but if the non-address portion of the generation number of the input packet does not coincide with that of the queuing data in firing control unit 6 as described above, the flag can be set to "1". If a data packet with its flag SF being set to "1" is input, all the function portions except firing control unit 6 in information processor 30 shown in FIG. 32 send the input packet without performing any processing. Accordingly, when the through flag SF stored in the data packet is set to "1" and then reset to "0", a data pair is produced in firing control unit 6, and the data packet is output from firing control unit 6 in a packet structure storing the left/right operand data as shown in FIG. 33, in other words, a firing takes place.

In FIG. 32, the data packet output from firing control unit 6 is applied to operation unit 2. Operation unit 2 inputs the data packet, decodes the instruction code of the input packet, performs a prescribed operation processing to the left operand data or right operand data stored in the input data packet based on the result of decoding, writes the operation result in the field f6 of the input data packet and outputs the input data packet. The data packet output from operation unit 2, is applied to branch portion 3. Branch portion 3 selectively outputs the input data packet to one of the outside of information processor 30 and junction portion 4 based on the node number of the input data packet. Junction portion 4 inputs the data packet applied from the outside of the information processor 30 or branch portion 3 and outputs the input data packet to program storage unit 5 in the order of input.

Thus, the circulation of the data packet shown in FIG. 33 from program storage unit 5→firing control unit 6→operation unit 2→branch portion 3→junction portion 4→program storage unit 5→ . . . permits an operation processing based on the data flow program stored in program storage unit 5.

In the method of controlling program execution utilizing the conventional storage unit 5 as described above is encountered with a disadvantage that the mechanism forming the hardware circuits of program storage unit 5 is complicated, because the number of fetching program data differs depending upon whether or not a copying processing operation by the copying flag CPY, or a constant data processing operation by the constant flag CNT is present. This disadvantage will be described in conjunction with FIG. 36.

Program storage unit 5 shown in FIG. 36 includes transfer control portions 51 and 52, input and output registers 53 and 54, a memory control portion 55, a memory 56 for storing a data flow program, and a flag detection portion 57 for detecting the states of a copying flag CPY and a constant flag CNT read out from memory 56. Transfer control portion 51 upon receiving a transfer pulse indicating that a data packet is output from junction portion 4, applies a control pulse to store the data from junction portion 4 and output the same at a time and applies a transfer pulse to transfer control portion 52. Control portion 52, upon receiving the input transfer pulse, applies a control pulse to control output register 54 to store and output the data applied from input register 53 and memory 56. Accordingly, when the data packet output from junction portion 4 is stored in the input register 53 of program storage unit 5, the data stored in register 53, immediately before that, is output to the circuits from the next stage forward, and the data stored in output register 54 is output to a pair data detection portion 6 in a data packet.

The data packet output from junction portion 4 is input in input register 53, once stored therein, and then applied to output register 54 to be stored therein. Memory control portion 55 operates to read out the next order program data from memory 56 by addressing based on the node number of the input packet. The flags CPY and CNT of the read out program data are applied to detection portion 57, and the remaining data is applied to output register 54. The instruction code, node number, and identification code L/R of the data of the input packet stored in output register 54 are updated utilizing the next program data read out from memory 56. If the result of flag detection of flag detection portion 57 indicates that it is not necessary to perform another fetching operation to memory 56, the data packet stored in output register 54 is directly output to firing control unit 6. If the result of flag detection of flag detection portion 57 indicates that it is necessary to perform another fetching operation to memory 56, the first data packet from output register 54 is output to firing control unit 6, transfer control portion 51 is instructed to produce another data packet, and a feedback control to instruct memory control portion 55 to produce another memory access cycle to memory 56 is made. At that time, transfer control portion 51 once again makes a control to transfer the data packet output from junction portion 4 and stored in input register 53 to output register 54. In parallel to this, memory control portion 55 reads out data from the next addressing region following the addressing region immediately before, and therefore the read out data is applied to output register 54 in which the second data packet is produced. The produced second data packet is output to firing control unit 6 following the first data packet under the control of transfer control portion 52. At that time, in order to achieve such a structure that data packets are output without interruption from a view of the output side of program storage unit 5, the mechanism of transfer control portions 51 and 52, and memory control portion 55 become very sophisticated.

Furthermore, due to the above-described copying processing operation or, constant data processing operation, the number of steps in the data flow program stored in the program memory of program storage unit 5 is reduced to the half the number of the maximum program steps which can be stored in the memory in the worst case. Thus, the number of program steps which can be stored changes depending upon the content of a program. Therefore, a determination whether or not all the program data can be stored in the program memory must be made in advance and finally the program data must be appropriately divided depending upon the result of determination. This is undesirable in practical applications.

It is assumed that the number of maximum program steps which can be stored in the program memory of program storage unit 5 is 256, for example.

$$Y=a_i * X \text{ (where } a_i\text{: constant data, } Y\text{: resultant data, } X\text{: input variable data)} \quad (1)$$

There is present a method of operation by which a plurality of the above-described equations (1) are prepared, a node numbers attached to input variable data X is appropriately changed, and one of the plurality of operation equation (1) is selected to produce a result. In this case, since two steps are necessary, one for an operation instruction * and the other for constant data ai for the number of program steps per one equation (1) only 128 such equations (1) can be stored in the program memory (the worst case).

Meanwhile, there is present one method of operation by which a plurality kinds of operations such as addition and subtraction other than multiplication as given by the following equation (2) are prepared, node numbers attached to data X and Z are appropriately changed, and one of the plurality kinds of operations is selected for operation.

$$Y=X * Z \text{ (where } Y, X \text{ and } Z\text{: resultant data)} \quad (2)$$

In this case, since one step is necessary for each equation (2), 256 such equations (2) can be stored in the program memory (the best case).

Accordingly, if a data flow program produced by mixing the above equations (1) and (2) is stored in the program memory, the number of equations (1) and (2) which can be stored in the program memory changes in the range from 128 to 156 depending upon how many equations which have constant data, in other words the above equations (1) are included. Differently stated, if a data flow program in which a plurality of equations including the above equations (1) and (2) are described is stored in the program memory, one has to check whether or not each of the equations described in the program has constant data in order to determine whether or not the program can be stored in the program memory, and therefore the conventional information processor is not very much practical.

Furthermore, although a packet stored with a 2-input instruction code must queue for one operand data to be paired therewith in the queuing memory of firing control unit 6, the processing is sometimes wasted. More specifically, among 2-input instruction codes, in the case of an instruction code whose one operand data is constant data, although a data packet stored with constant data and a data packet stored with operand data to be paired with the constant data are sequentially read out from program storage unit 5 as described above, the operand data is once written in the queuing memory and queues for the constant data input immediately after. Thus, high speed processing is impaired due to such a redundant processing procedure.

SUMMARY OF THE INVENTION

It is one object of the invention to provide a data driven type information processor permitting size reduction of the apparatus by simplification of the structure of the apparatus.

Another object of the invention is to provide a data driven type information processor permitting increase of the speed of program execution.

In order to achieve the above-described objects, a data driven type information processor according to the invention executes a data flow program utilizing a data packet formed of a destination field for storing destination information, an instruction field for storing instruction information, and a data field, and includes a storage unit, a control unit, and an operation unit.

The storage unit includes a plurality of regions for storing at least one program data including instruction information and destination information, and at least one queuing data including operand data corresponding to each program data.

The control unit receive a data packet, addresses a region in the storage unit by the content of the destination field of the received packet, and writes as queuing data the content of the data field in the received packet into the addressed region based on the content of the addressed region or produces an output data packet corresponding to each program data in the addressed region. The destination field and instruction field in each data packet produced and output are stored with destination information and instruction information, respectively in corresponding program data, while the content of the data field in the received packet is stored into the data field in each produced packet. Furthermore, in response to that queuing data is stored in the addressed region, each queuing data being stored into the produced data packet which stores corresponding program data (destination information and instruction information) in addition to the content of the data field, and each produced packet is output to the operation unit.

The operation unit receives the data packet produced and output by the control unit, operates on the content of the data field in the received packet according to the content of the instruction field in the received packet, stores the operation result data into the data field in the received packet and outputs the received packet.

When a program is executed in the data driven type information processor according to the invention, the control unit reads out program data and operand data corresponding to the program data from the addressed region of the storage unit by the content of the destination field in the received packet, and produces and applies to the operation unit a data packet which stores an operand data pair formed of the read out operand data and the content of the data field in the received packet, and the read out program data. Therefore, an accessing operation for obtaining the next order program data and an accessing operation for obtaining queuing data, which were conventionally performed separately, can be performed by this one reading operation. Thus, the number of processing steps at the time of program execution is reduced, and the speed of program execution increases as a result.

Furthermore, a memory for storing program data and a memory for queuing operand data, which were conventionally separately provided are achieved by only one memory in a shared manner in the storage unit. Further, the peripheral circuits associated with these memories are also shared (unified), and the structure of the information processor is simplified.

Since the storage unit stores at least one program data in each region addressed by the control unit, the size of the object module of a program in the memory for program data storage in the information processor can be reduced.

Since the control unit can read out a plurality of program data from the storage unit for every addressing, the number of read outs of program data is reduced, and thus time for program execution can be reduced by the amount.

The foregoing and other objects, features, aspects and advantages of the present invention will become more apparent from the following detailed description of the present invention when taken in conjunction with the accompanying drawings.

Figure 1:
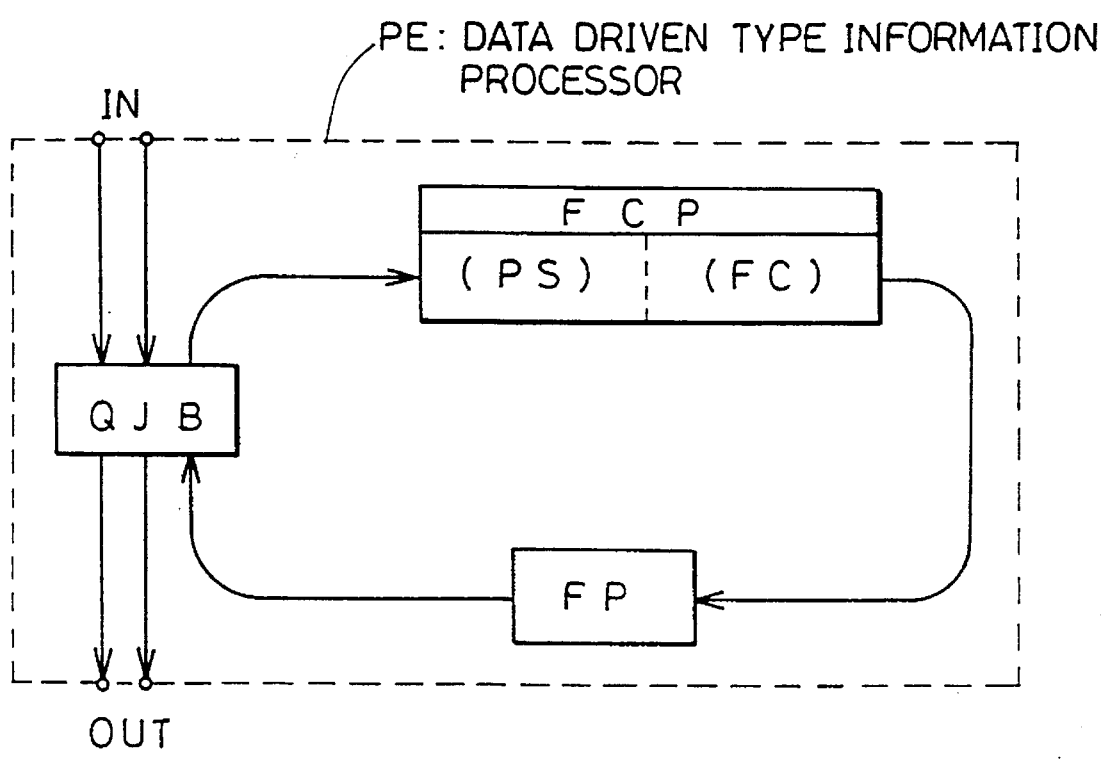
FIG. 1 is a block diagram showing a data driven type information processor according to a first embodiment of the invention.
Figure 2:
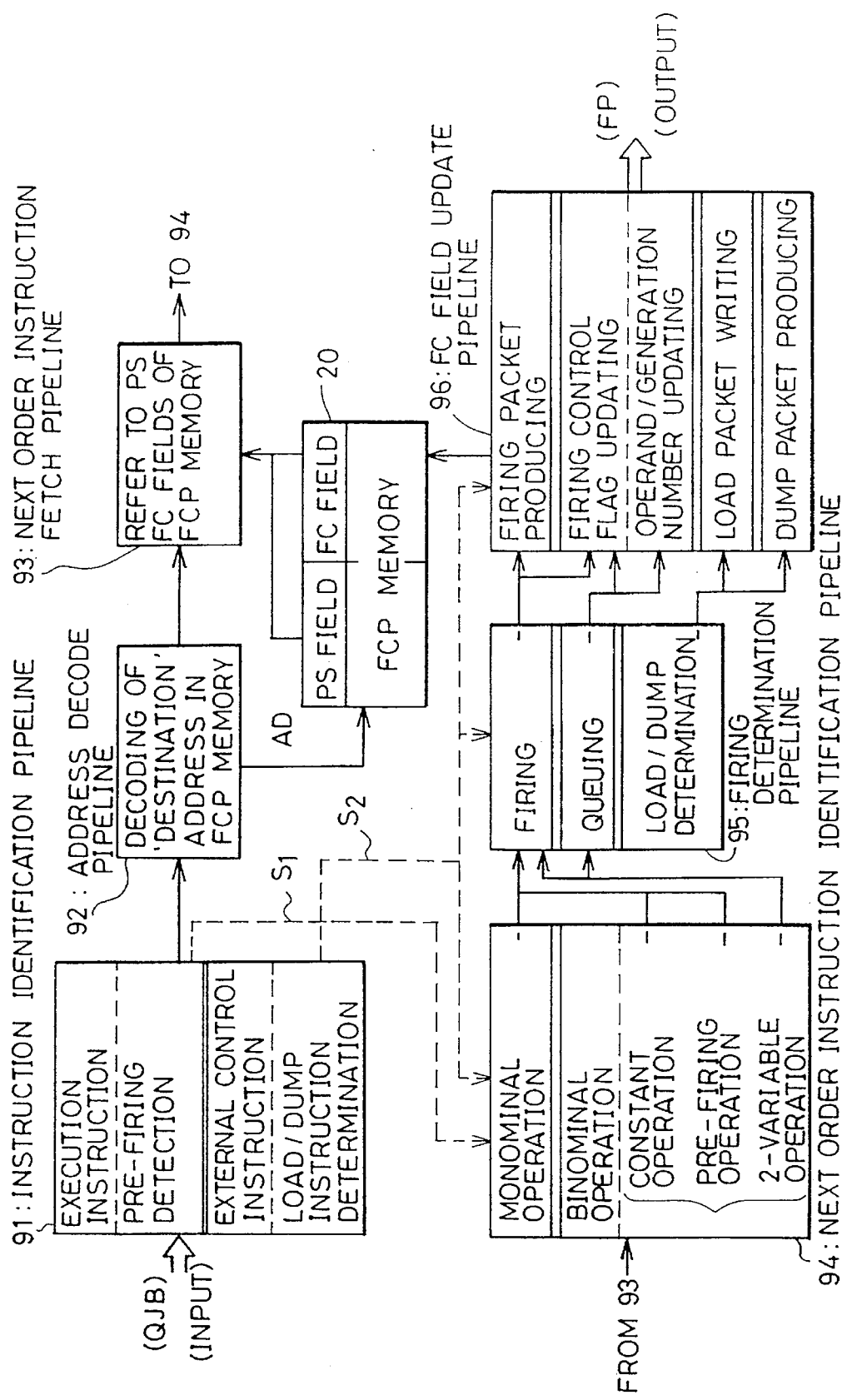
Figure 6:
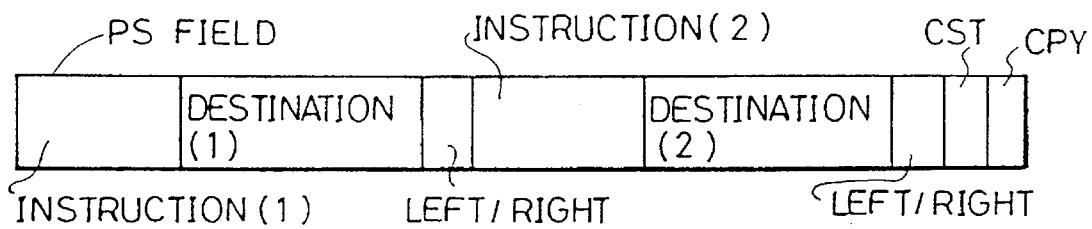
Figure 7:
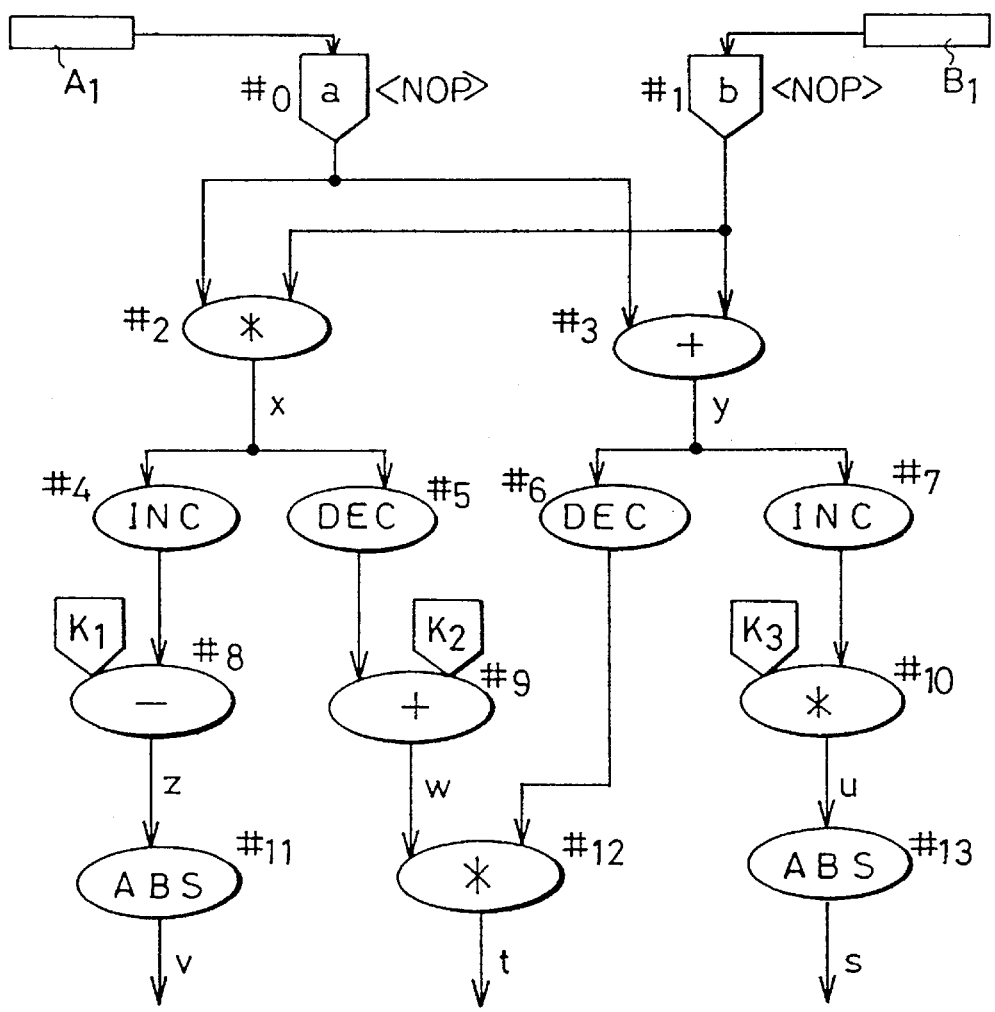
Figure 8A:
Figure 8B:
Figure 10:
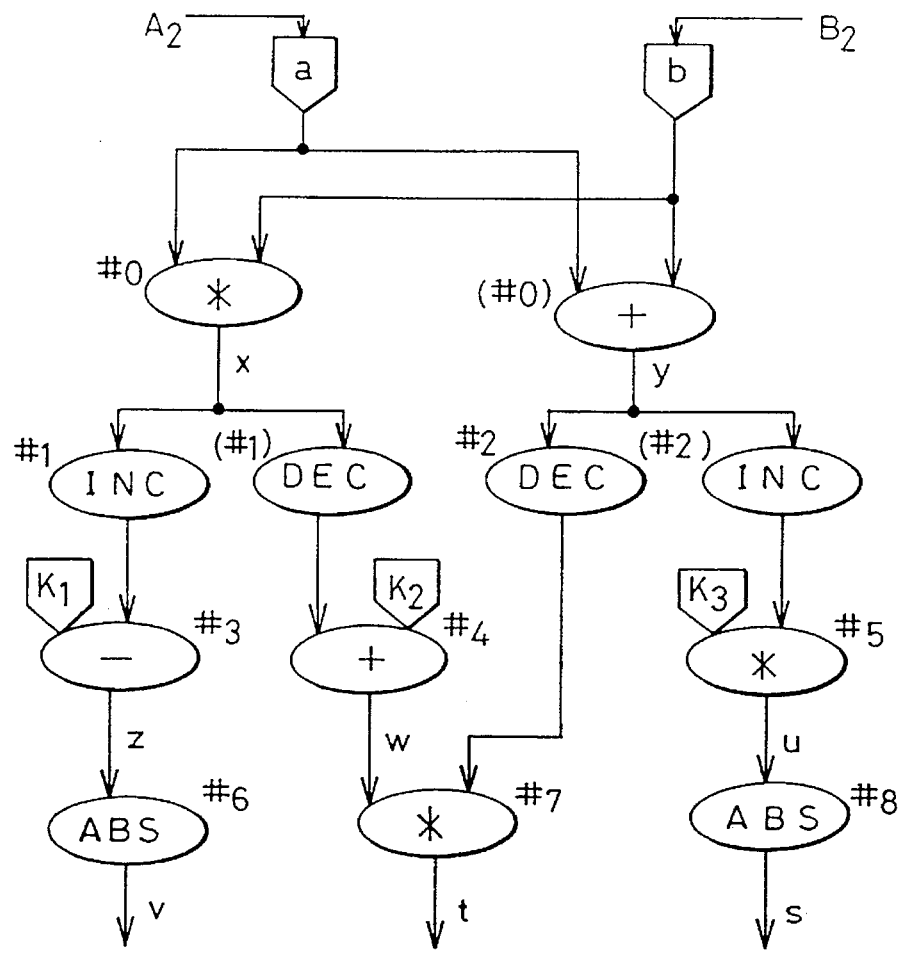
Figure 11A:
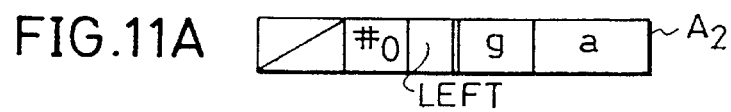
Figure 11B:
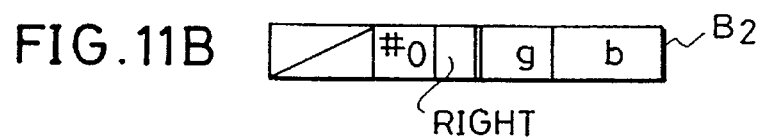
Figure 13:
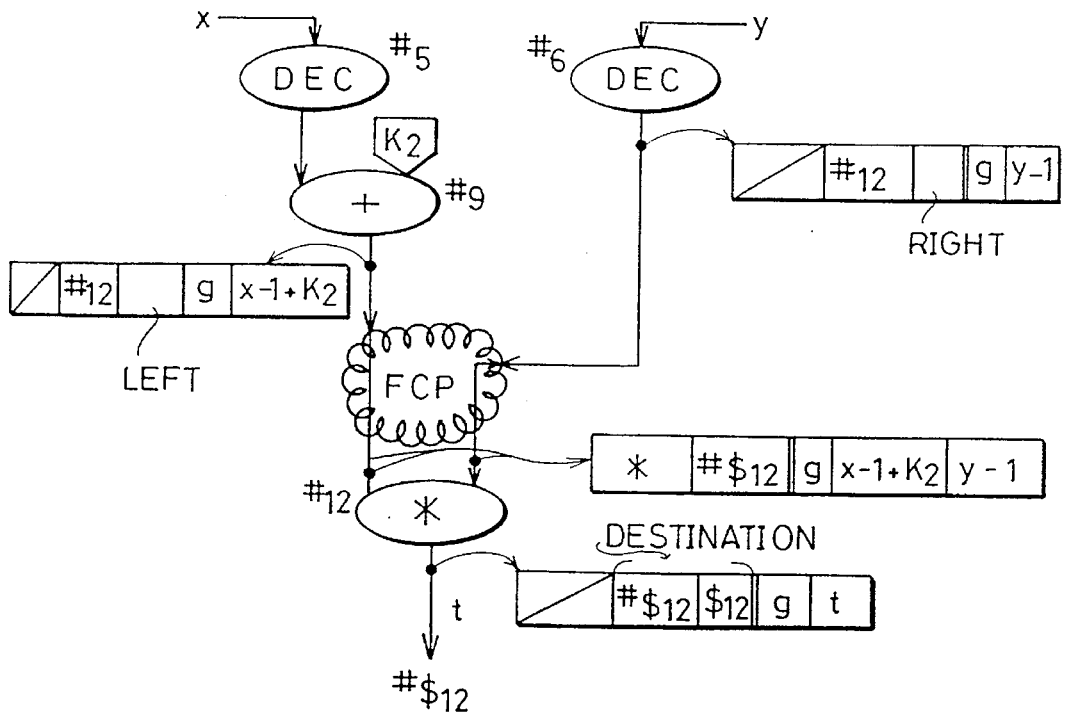
Figure 14:
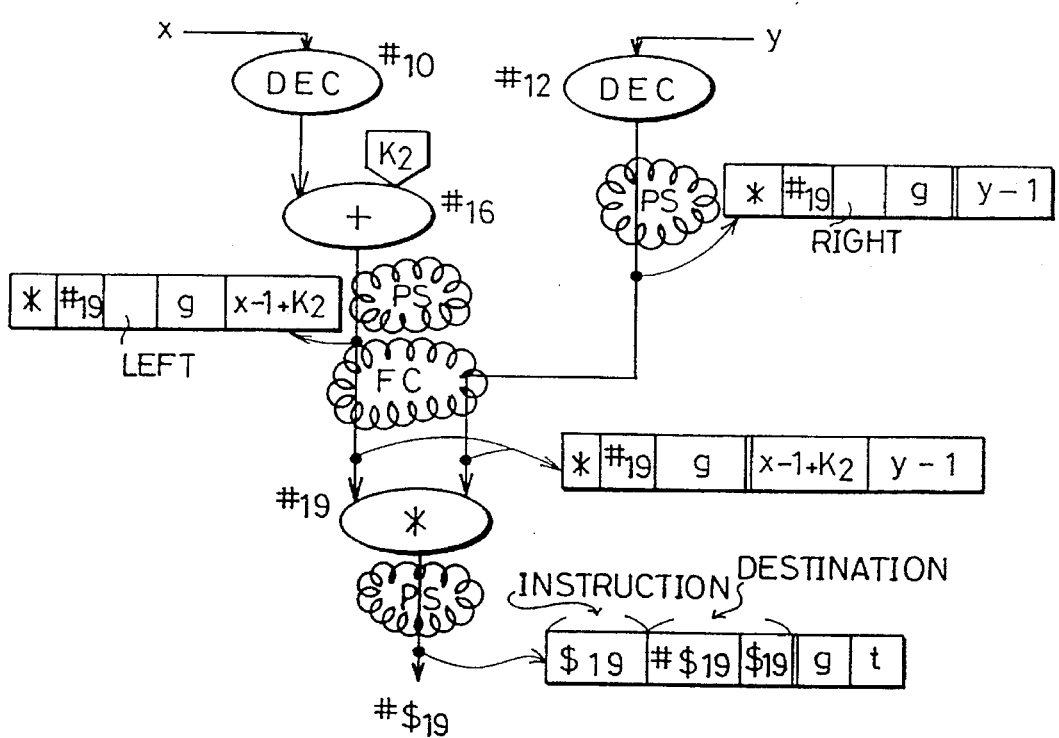
Figure 16:
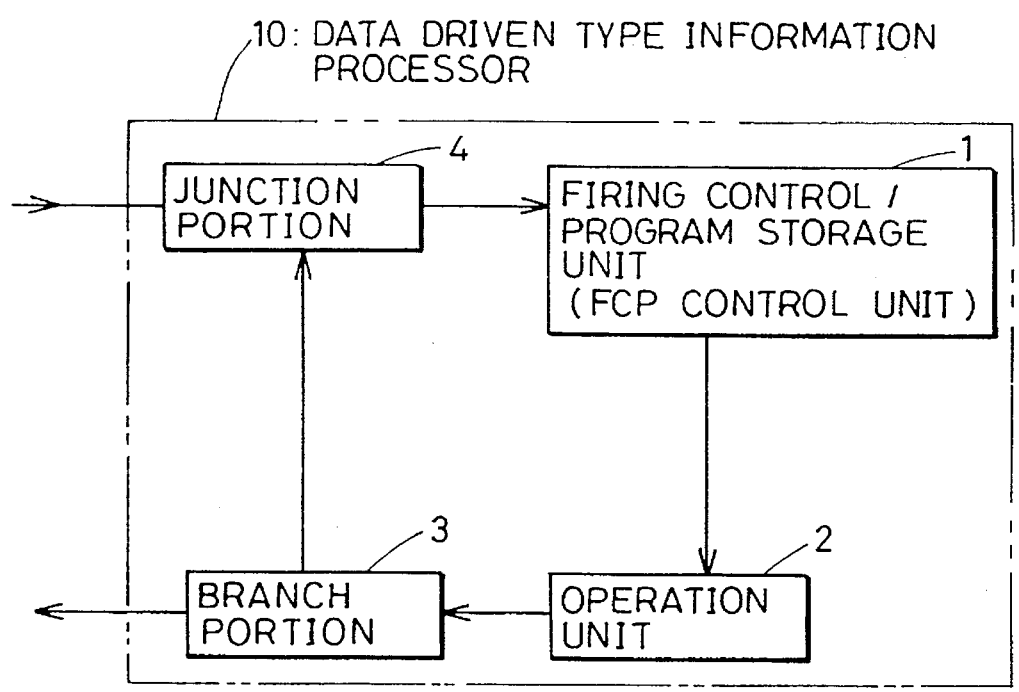
Figure 17:
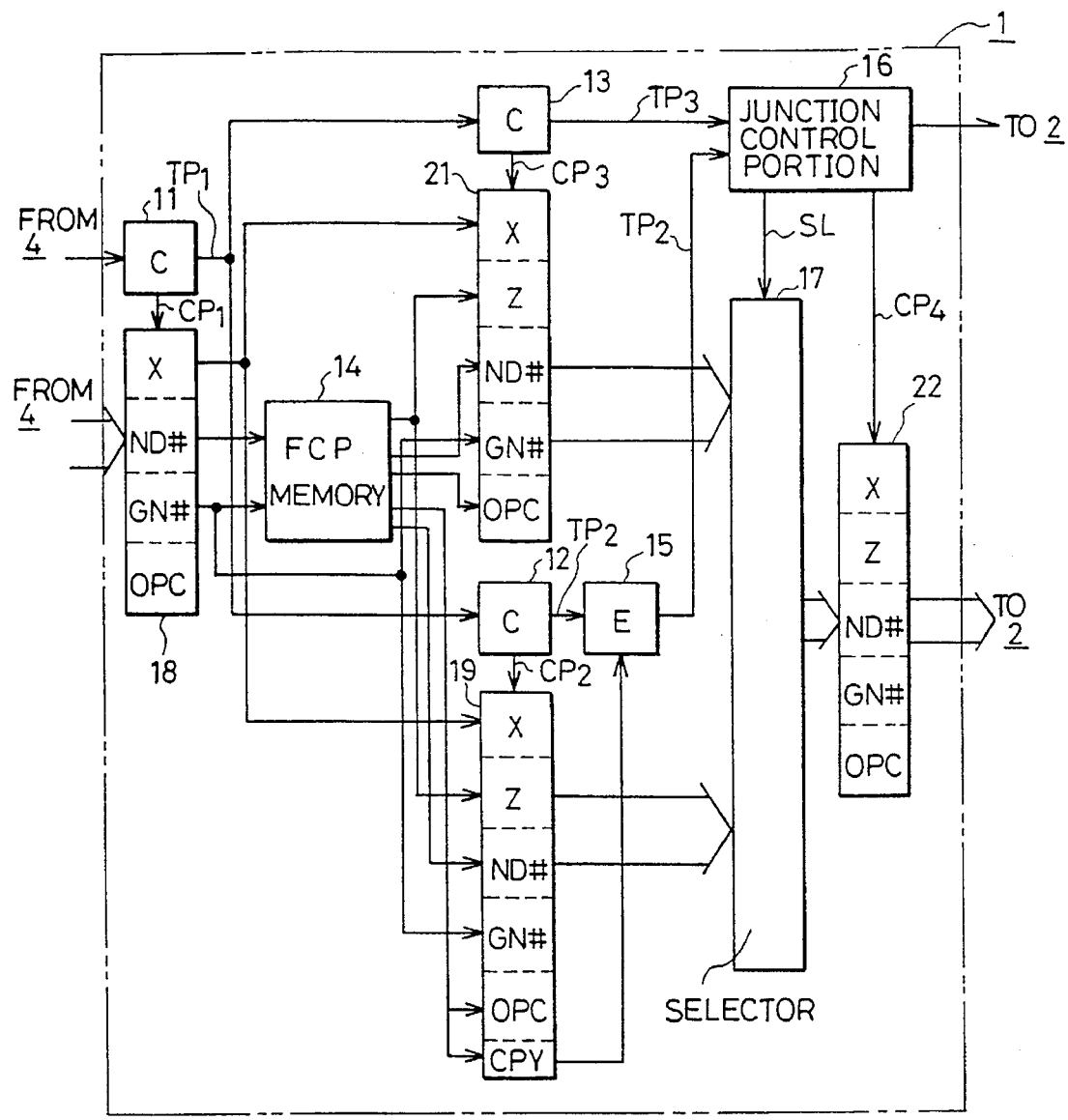
Figure 24:
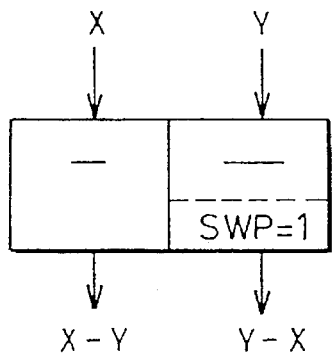
Figure 25:
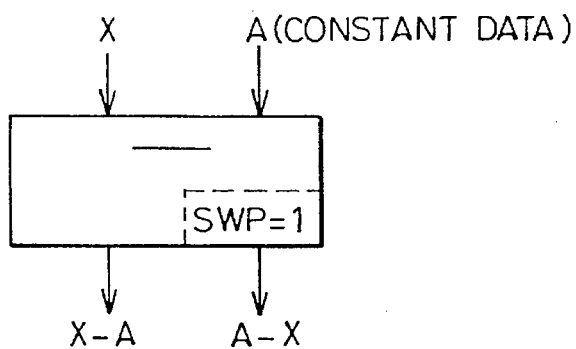
Figure 32:
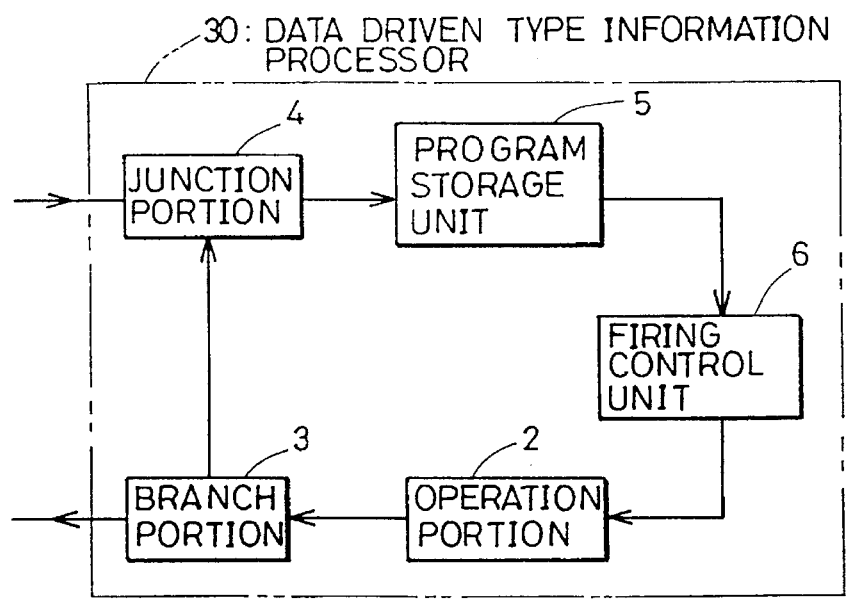
Figure 26:
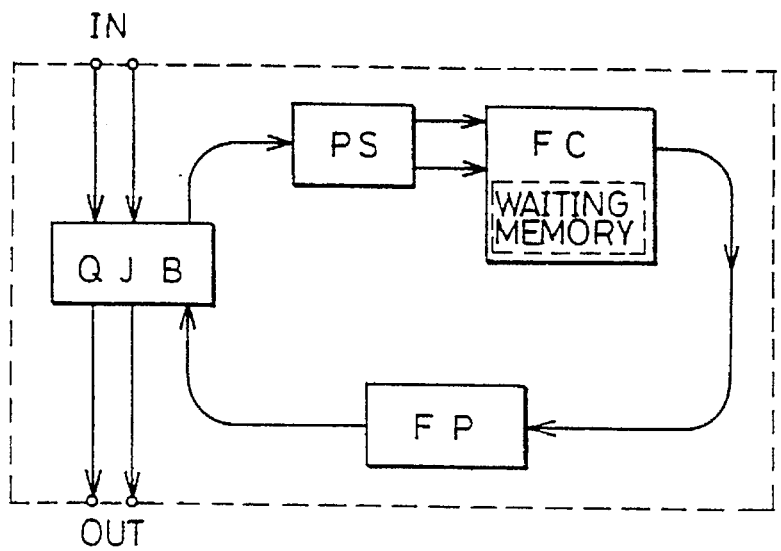
Figure 27A:
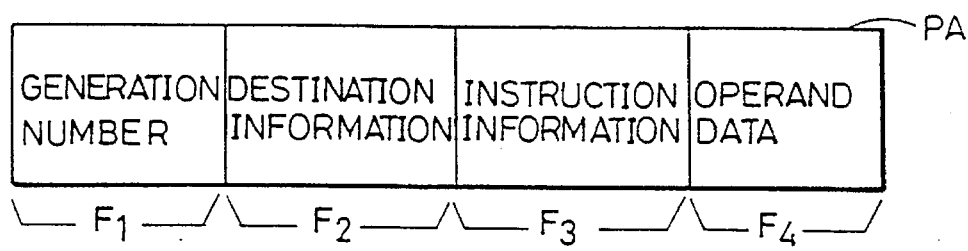
Figure 27B:
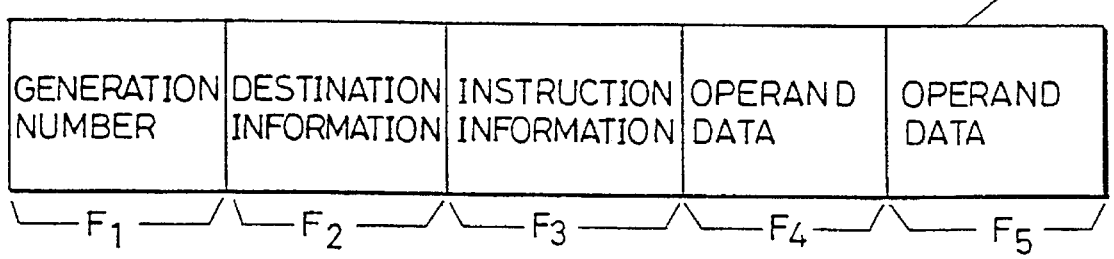
Figure 28:
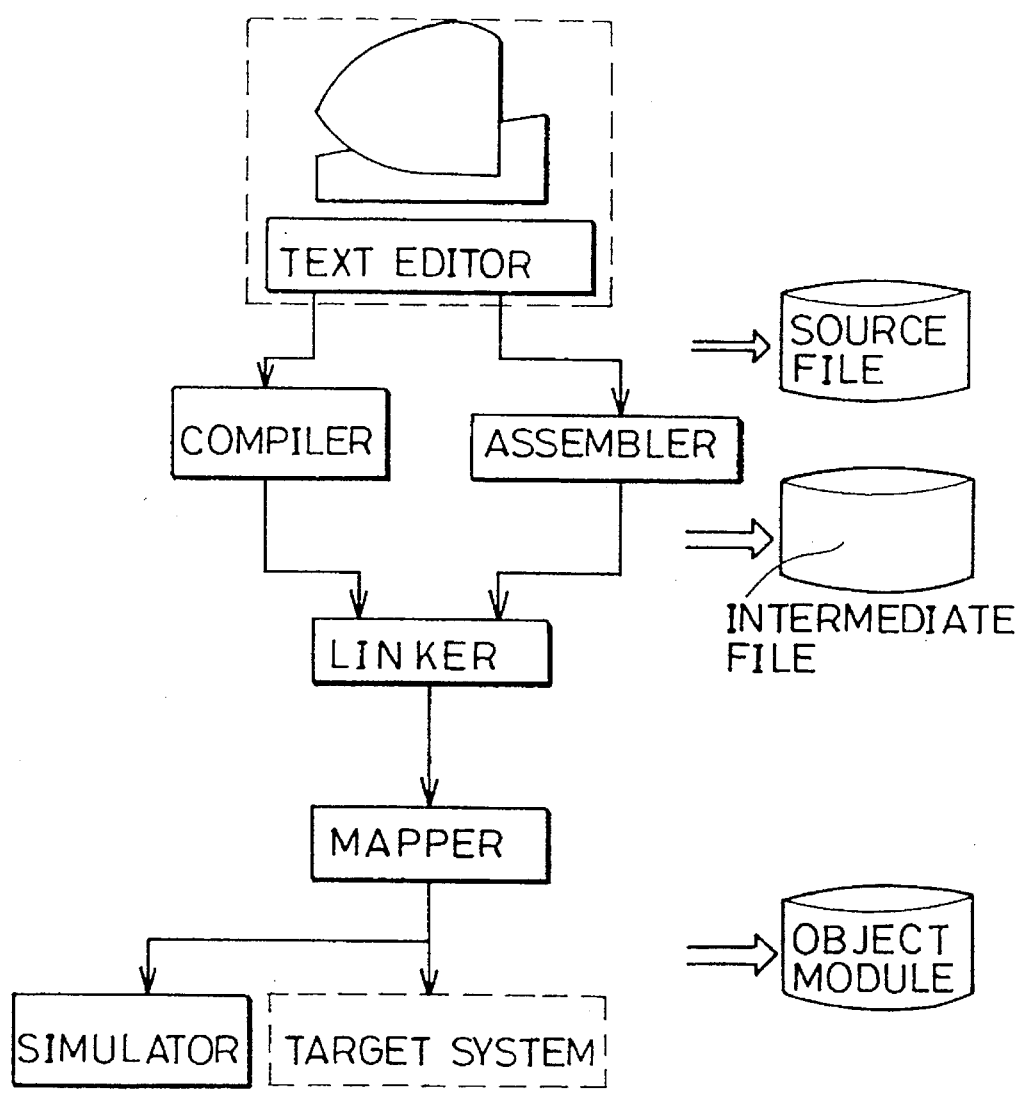
Figures 29, 30:
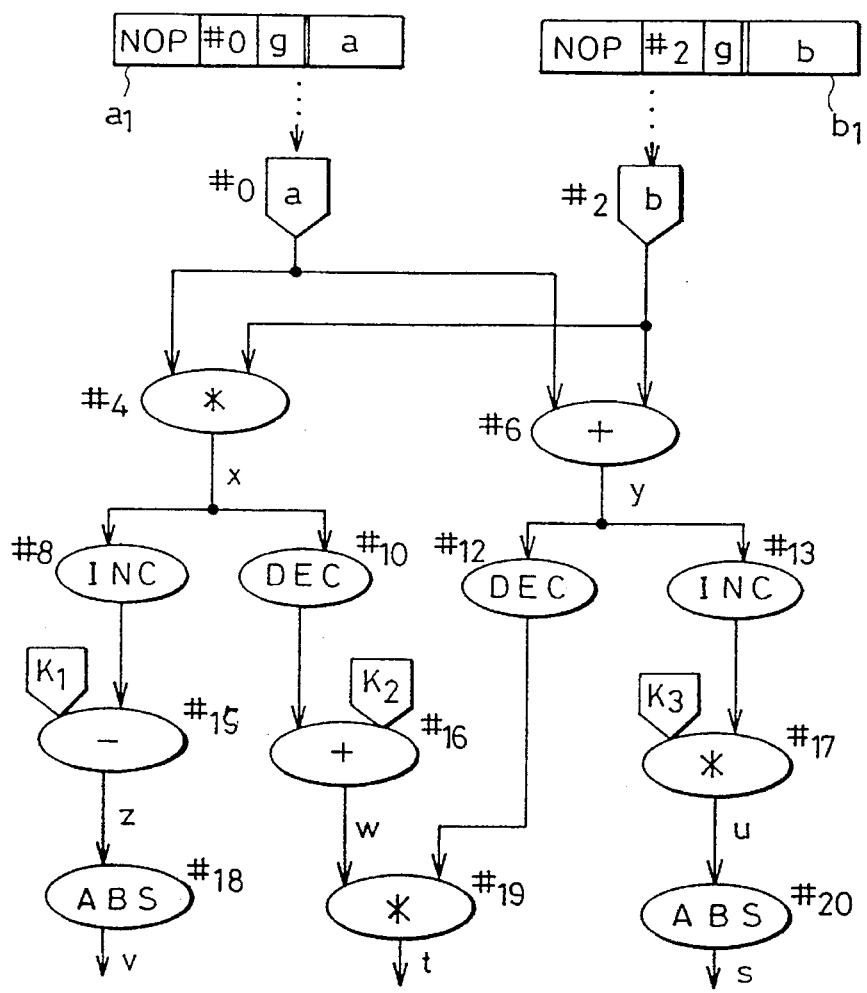
Figure 33:
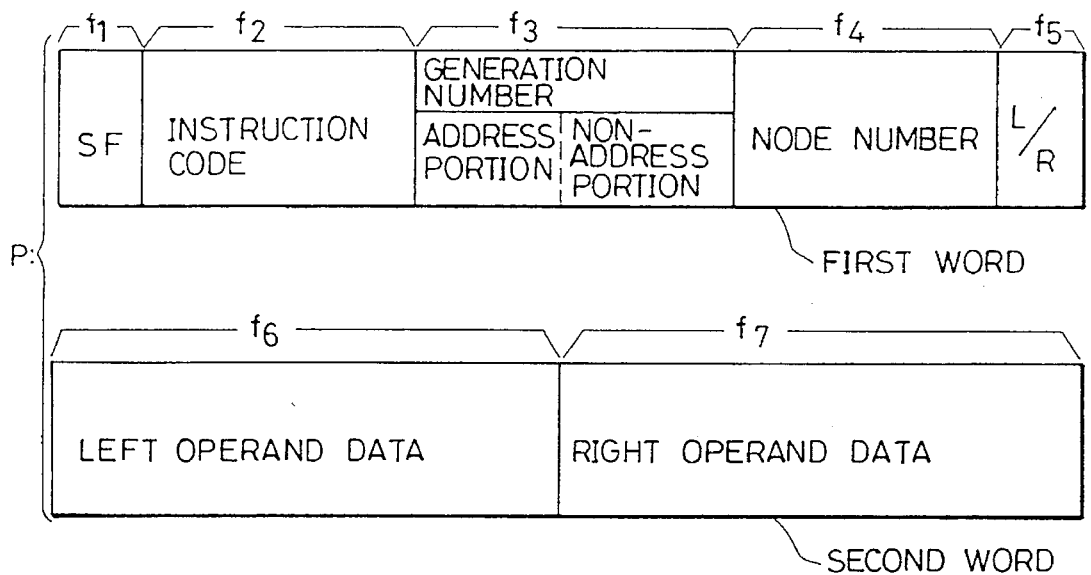
Figure 34:
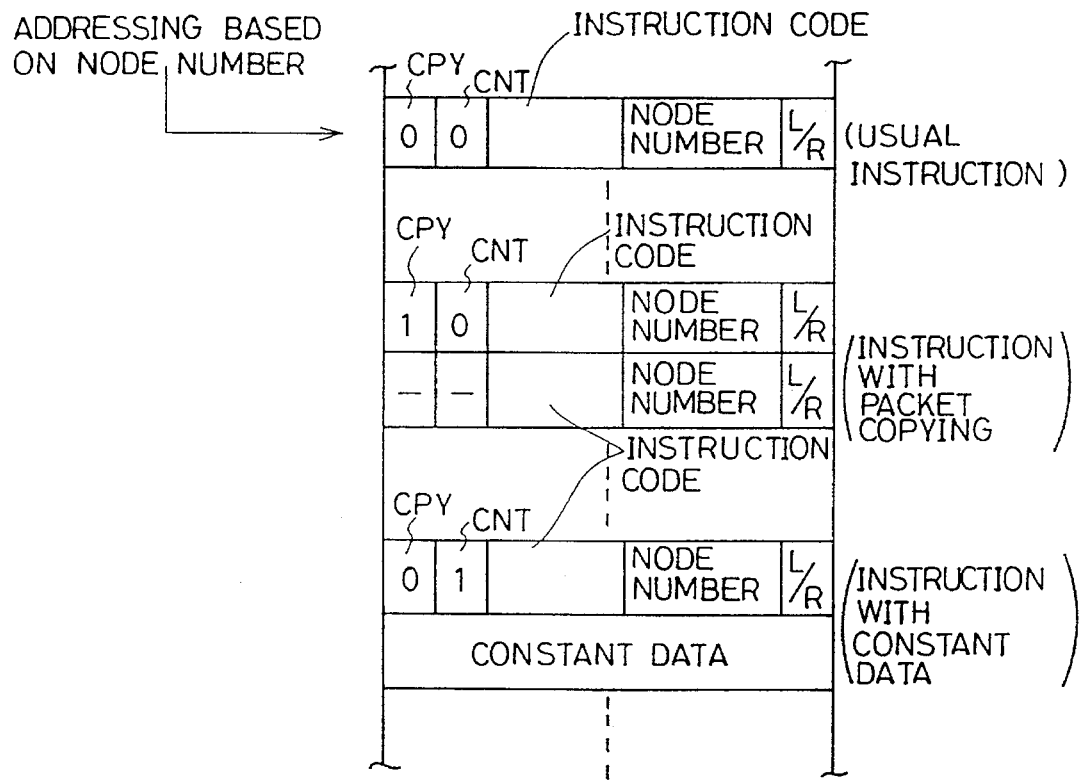
Figure 35:
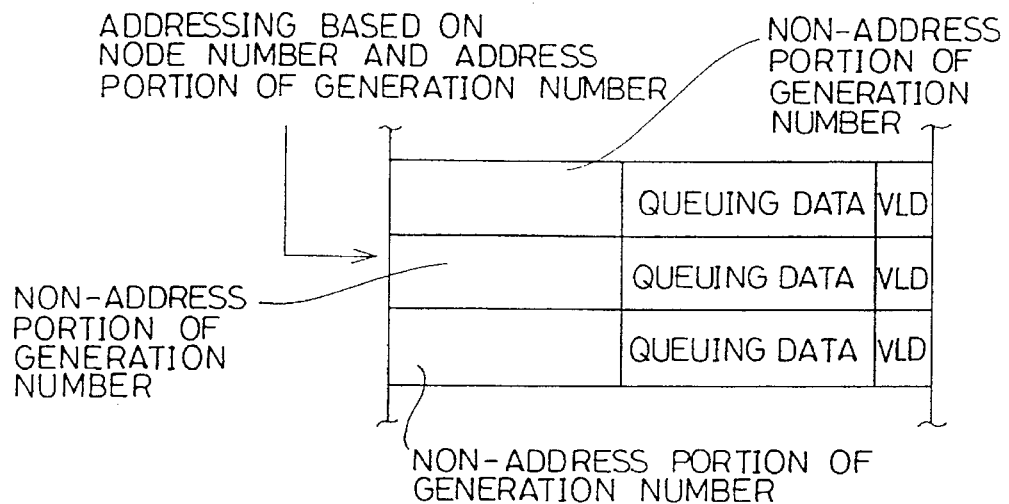
Figure 36:
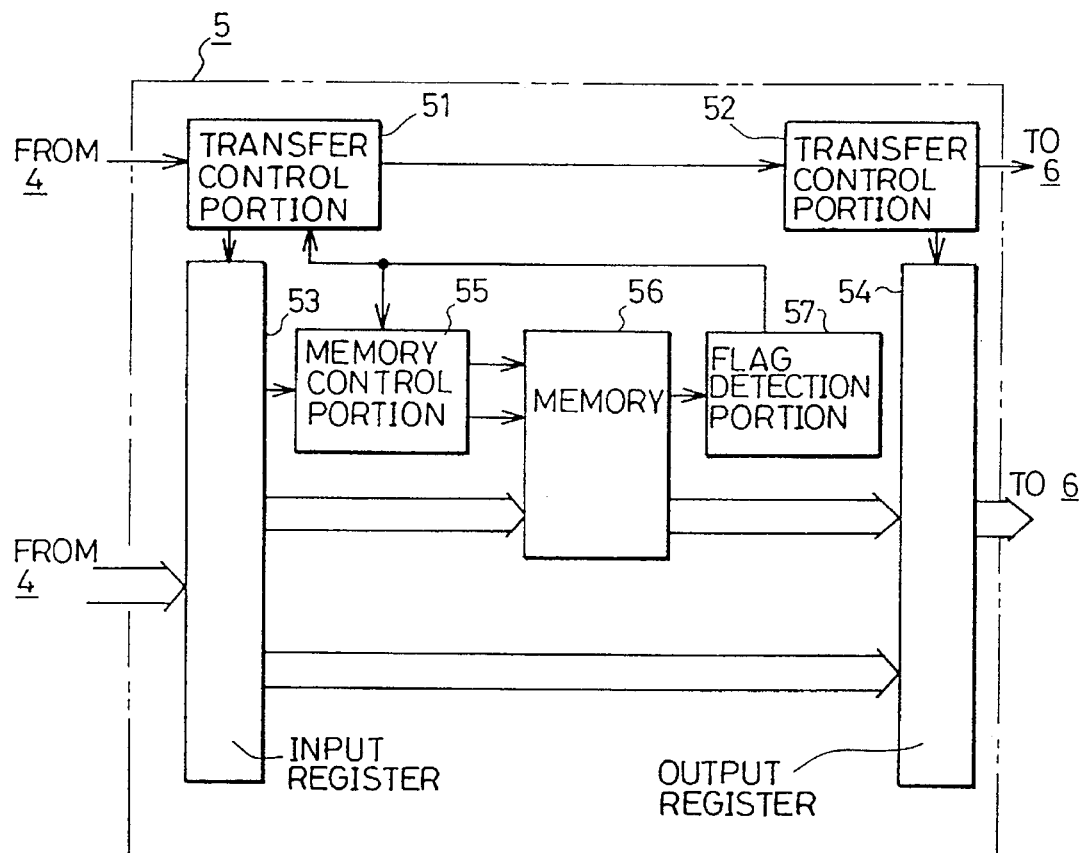

2 is a block diagram showing the structure of a firing control unit with a program storage shown in FIG. 1;

FIG. 3 is a representation showing the structure of an FCP memory shown in FIG. 2;

FIG. 4 is a representation showing one example of the structure of a PS field in FIG. 3;

FIG. 5 is a representation showing one example of the structure of an FC field in FIG. 3;

FIG. 6 is a representation showing another example of the structure of the PS field in FIG. 3;

FIG. 7 is a representation showing one example of a flow graph obtained from a program in FIG. 29 according to the first embodiment the invention;

FIGS. 8A and 8B are representations each showing a data packet input in a data driven type information processor when program execution according to the flow graph in FIG. 7 is initiated;

FIG. 9 is a representation showing a storage content when an object module obtained from the data flow graph is stored in a FCP memory;

FIG. 10 is a representation showing another example of a flow graph obtained from the program in FIG. 29 according to the first embodiment of the invention;

FIGS. 11A and 11B are representations each showing a data packet input to a data driven type information processor when a program execution according to the flow graph shown in FIG. 10 is initiated;

FIG. 12 is a representation showing a storage content when an object module obtained from the flow graph in FIG. 10 is stored in an FCP memory;

FIG. 13 is a representation showing how a multiplication instruction in the flow graph in FIG. 7 is executed according to the flow of a data packet;

FIG. 14 is a representation showing how a multiplication instruction in a flow graph in FIG. 30 is executed along the flow of a data packet;

FIG. 15 is a table showing results of comparison of the sizes of the object modules shown in FIGS. 9, 12, and 31 for every item;

FIG. 16 is a block diagram showing a structure of a data driven type information processor applied to second to fourth embodiments of the invention;

FIG. 17 is a block diagram showing the structure of a firing control/program storage unit shown in FIG. 16;

FIG. 18 is a representation showing part of a content stored in an FCP memory according to the second embodiment of the invention;

FIGS. 19A–19C are representations each for use in illustration of a method of addressing an FCP memory and a program storage format in the memory;

FIG. 20 is a representation showing one example of the structure of a program word including a flag inverting a left/right identification code L/R stored in a data packet input to an FCP Control unit;

FIGS. 21A–21D are representations each showing an instruction newly supported by the second embodiment of the invention;

FIG. 22 is a representation showing part of a storage content in an FCP memory according to the third embodiment of the invention;

FIG. 23 is a representation showing part of a storage content in an FCP memory according to the fourth embodiment of the invention;

FIG. 24 is a representation showing one example of an instruction implemented Utilizing a left and right attributes inversion flag SWP in the third embodiment;

FIG. 25 is a representation showing one example of the structure implemented utilizing a left and right attributes inversion flag SWP in the fourth embodiment;

FIG. 26 is a block diagram showing one example of the structure of a conventional data driven type information processor;

FIGS. 27 and 27B are representations each showing the field structure of a data packet in a data driven type information/processor;

FIG. 28 is a representation schematically showing a tool to aid a user to develop a data flow program and its developing procedure;

FIG. 29 is a representation showing one example of a calculation program;

FIG. 30 is a representation showing a flow graph obtained from the program in FIG. 19;

FIGS. 31A and 31B are representation each showing a storage content when an object module obtained from the flow graph in FIG. 30 is stored in a program storage unit and a queuing memory in a firing control unit;

FIG. 32 is a block diagram showing another example of the structure of a conventional data driven type information processor;

FIG. 33 is a representation showing the field structure of a data packet circulating through the information processor in FIG. 32;

FIG. 34 is a representation showing part of a storage content of a program storage unit in FIG. 32;

FIG. 35 is a representation showing part of a storage content in a queuing memory in a firing control unit in FIG. 32; and FIG. 36 is block diagram showing a mechanism for reading out a program from the program storage unit in FIG. 32.

DESCRIPTION OF THE PREFERRED EMBODIMENTS

Now, first to fourth embodiments of the invention will be described in conjunction with the accompanying drawings.

FIG. 1 is a block diagram showing a data driven type information processor according to a first embodiment of the invention.

Referring to FIG. 1, data driven type information processor PE includes an input/output control unit QJB, a firing control unit with program storage FCP having its input stage connected to the output stage of input/output control unit QJB and including the functions of program storage unit PS and firing control unit FC, and an operation unit FP having its input stage connected to the output stage of control Unit FCP.

Since input/output control unit QJB and operation unit FP function in the same manner as those of the conventional example in FIG. 26 described above, a detailed description thereof will not be provided. It is noted that the field structure of a data packet in data driven type information processor PE is the same as that shown in FIG. 27, and therefore description thereof will not be provided.

Firing control unit with program storage FCP functions both as program storage unit PS for storing a data flow program and firing control unit FC having a memory for data queuing in the conventional example, and has one memory space shared by both functions.

The block structure of firing control unit with program storage FCP is illustrated in FIG. 2. In the conventional data driven type information processor, program storage unit PS and firing control unit FC are each divided into six pipelines. They are called micropipelines, and the block shown in FIG. 2 combines those micropipelines to form 6 pipelines. Control unit FCP is formed of an FCP memory 20, an instruction identification pipeline 91 having its input stage connected to the output stage of input/output control unit QJB, an address decode pipeline 92, a next order instruction fetch pipeline 93, a next order instruction identification pipeline 94, a firing determination pipeline 95 and an FC field update pipeline 96 having its output stage connected to operation unit FP.

FIG. 3 is a representation showing the structure of FCP memory 20 shown in FIG. 2.

Referring to FIG. 3, FCP memory 20 has address spaces addressed by pointer addresses #0, #1, #2, ... and includes a PS field for storing a data flow program and an FC field for storing queuing data for each pointer address. Accordingly, when a pointer address is addressed, program data is read/ written from/to a corresponding PS field, firing detection is made with respect to data stored in a corresponding FC field, and data is written in FC field for queuing. Thus, the program memory of program storage unit PS and the queuing memory of firing control unit FC in the conventional example are combined to form FCP memory 20.

FIG. 4 is a representation showing one example of the structure of PS field in FIG. 3.

FIG. 5 is a representation showing one example of the structure of the FC field in FIG. 3.

FIG. 6 is a representation showing another example of the structure of the PS field in FIG. 3.

The PS field in FIG. 4 stores an instruction, a destination (1), a left/right flag related to the destination (1), a destination (2), a left/right flag related to the destination (2), a constant flag CST and a copying flag CPY. The instruction indicates the next order instruction information, destinations (1) and (2) indicate the next order destination information (the next order node numbers), the left/right flag related to the destination (1) indicates whether an operation result according to a corresponding instruction is the left input or right input of the node of the destination (1), and similarly the left/right flag related to the destination (2) indicates whether an operation result according to a corresponding instruction is the left input or right input of the node of the destination (2). The constant flag CST indicates if a corresponding instruction uses constant data for operand data, and is set (="1") only if the constant data is used as the operand data. The copying flag CPY is set (="1") only when the operation result according to the instruction is operand data on at least two next order instructions as it is the conventional example. When the copying flag CPY is set, the destinations (1) and (2) are stored in the PS field.

The FC field in FIG. 5 stores a queuing operand, a queuing generation number and a firing control flag VLD. The queuing operand is operand data including constant data necessary for program execution processing and is written in the FC field for firing and waits. The queuing generation number is the offset field of the generation number of a corresponding queuing operand. The firing control flag VLD is set (="1") when a queuing operand is stored in a region corresponding to a corresponding pointer address and in a queuing state (not yet firing), and is otherwise reset (="0").

Stored in the PS field in FIG. 6 are an instruction (1), a destination (1), a left/right flag related to the destination (1), an instruction (2), a left/right flag related to the destination (2), a constant flag CST, and a copying flag CPY. The instructions (1) and (2) indicate instruction informations (operation instructions), the destination (1) indicates the next order instruction information (node number) of an operation result according to the instruction (1), and the destination (2) indicates the next order destination information (node number) of an operation result according to the instruction (2). The constant flag CST is set only when operand data on the instruction (1) or (2) is constant data.

Now, referring back to FIG. 2, each pipeline will be described.

Instruction identification pipeline 91 receive a data packet PA applied from the input/output control unit QJB of the preceding stage, decodes instruction information stored therein, and identifies if the instruction is an execution instruction or an external control instruction. The execution instruction is an instruction allocated to a node of a data flow graph, while the external control instruction is a load instruction of writing applied data into FCP memory 20 or a dump instruction of reading out data stored in FCP memory 20.

If the instruction information is identified as an execution instruction in instruction identification pipeline 91, whether or not sequentially input datas form a pair by each other (if a firing takes place) is determined based upon whether or not the destination information (node number) of the sequentially input data packets PA agrees with each other. This permits previous detection of accessing competition for the same addressing region in FCP memory 20 and the detection is called pre-firing detection. When a firing is previously detected, a pre-firing detection signal S1 is applied to next order instruction identification pipeline 94.

When the instruction information of the input data packet PA is identified as an external control instruction, a load/dump instruction determination signal S2 is applied to next order instruction identification pipeline 94, firing determination pipeline 95, and FC field update pipeline 96.

Address decode pipeline 92 receives the applied data packet PA, performs a decoding processing based on destination information stored therein, and applies to FCP memory 20 an address AD for addressing FCP memory 20. At the same time, the input data packet PA is applied to next order instruction fetch pipeline 93.

Next order instruction fetch pipeline 93 receive the applied data packet PA, stores data read out from FCP memory 20 into the received data packet and outputs the received packet. More specifically, the received data packet PA is stored with data read out from a PS field and an FC field corresponding to a pointer address in FIG. 3 addressed based on an address AD. For example, if the PS field and FC field have the structures shown in FIGS. 4 and 5, the copying flag CPY is first referred to. If the copy flag CPY is reset, the instruction, destination (1) and the left/right flag of destination (1) of the PS field are read out, the read instruction is stored into the instruction field F3 of the received data packet PA, and the read out destination (1) and the left/right flag thereof are stored into destination field F2. Furthermore, if the constant flag CST has been set at the time, the constant data of FC field in FIG. 5 is read out and stored in the data field F4 of the input data packet PA.

Conversely, if the copying flag CPY has been set, two data packets each storing the instruction of PS field in the instruction field F3 are produced (copying processing), the destination (1) and the left/right flag thereof are stored in the destination field F2 of one of the data packets, and the destination (2) and the left/right flag thereof are stored in the destination field F2 of the other data packet. If the constant flag CST has been set, the constant data of FC field is each stored in the data fields F4 of both data packets. Thus, the data packet storing the data addressed based on the address AD and read out from FCP memory 20 is output to next order instruction identification pipeline 94. At that time, a firing control flag VLD is read out from the FC field as well.

It is noted that when the PS field of FCP memory 20 has a structure shown in FIG. 6, a data packet processed so as to store next order instruction information by the processing including a copying processing of the data packet according to the copying flag CPY is output.

Next order instruction identification pipeline 94 operates to pass through the received input data packet in response to input of a load/dump instruction determination signal S2, and otherwise identifies the instruction information of the received data packet and operates to output a data produced according to the result of the identification. Instruction information stored in a data packet is roughly divided into a monominal operation instruction and a binominal operation instruction, and the binominal operation instructions are divided into a constant operation instruction, a pre-firing operation instruction and a two-variable operation instruction. The pre-firing operation instruction is identified in response to input of the pre-firing detection signal S1. The two-variable operation instruction is an operation instruction about two different data packets which are not input sequentially and have the same destination information, as opposed to the pre-firing operation instruction. A data packet whose instruction information is identified as a monominal operation instruction is applied to operation unit FP through transition pipelines 95 and 96.

Firing determination pipeline 95 performs one of firing and queuing, and one of load and dump determinations about the received data packet based on the firing control flag VLD and the instruction information applied through pipeline 94. In the firing processing, the received data packet is directly output without writing of data of FCP memory 20 in response to the instruction information being a binominal operation instruction with the applied flag VLD being set. In the queuing processing, a preparation for setting a corresponding flag VLD is performed so that operand data is written in FCP memory 20 and a queuing state (non-firing state) is explicitly indicated, in response to the instruction information being a binominal operation instruction with the applied flag VLD being reset. In the load/dump determination processing, the data packet storing the load/dump instruction information is directly output to the output side, in response to input of the load/dump instruction determination signal S2.

FC field update pipeline 96 based on a received packet selectively performs a firing packet production, a firing control flag VLD updating, an operand data and generation number updating, a load packet writing and a dump packet production.

In the firing packet production processing, applied data packets are input to be formed as one data packet (fired) for output. At the same time, in the firing control flag updating processing, a corresponding firing control flag VLD in FCP memory 20 is reset in response to the firing.

The operand data and generation number updating processing updates the queuing operand and the queuing generation number by writing the operand data and generation number of an applied data packet in an FC field addressed by an address AD. At that time, the firing control flag VLD is set in the course of the firing control flag updating processing, in order to indicate that the queuing data stored in the FC field is in a non-firing state.

In the load packet writing processing or dump packet producing processing, a PS field or an FC field in FCP memory 20 addressed by an address AD are accessed in response to the instruction information of an applied data packet being one of a data loading or a data dumping instruction. In the load packet writing processing, data stored in the received data packet is loaded in an addressed PS field or FC field. In the dump packet production processing, data stored in an addressed PS field or FC field is read out to produce a data packet for output. Accordingly, if a load or dump instruction is set for the instruction information of a data packet PA, writing of desired data and reading of desired data with respect to FCP memory 20 can be performed in FC field update pipeline 96. The data packet output from FC field update pipeline 96 is applied to operation unit FP in FIG. 1.

FIG. 7 is a representation showing a flow graph obtained from the program in FIG. 29 according to one embodiment of the present invention.

FIGS. 8A and 8B are representations each showing a data packet input to data driven type information process PE when program execution according to the flow graph shown in FIG. 7 is initiated.

FIG. 9 is a representation showing a storage content when an object module obtained from the flow graph in FIG. 7 is stored in FCP memory 20. In FIG. 9, a slanted line means "not used"; "VLD" means firing control flag; a "1" means set and a "0" means reset "$" means valid destination data value; and "Ψ" means queuing operand data value.

The flow graph in FIG. 7 is produced by analyzing the program in FIG. 19 by a compiler (or an assembler).

The compiler, upon flow analysis of the program in FIG. 29, attaches a number identifying each arc output from each node (not shown), and uses the number for the node number of a node connected to the upper side of the arc. Accordingly, if an instruction allocated to each node is any of a monominal operation instruction, a binominal operation instruction, etc., there is only one arc for outputting the node, and the nodes are attached with node numbers #0, #1, #2, . . . in ascending order from the upper left to the lower right in the graph as shown in FIG. 7.

An operation according to the data flow program in FIG. 7 in data driven type information processor PE in FIG. 1, when a program is executed will be described in conjunction with FIGS. 1, 2, and 7 to 9. It is noted that deciding a firing priority according to generation numbers will not be described for the purpose of simplifying the description.

A data packet A1 in FIG. 8A stores node numbers #0 for destination information, "g" for a generation number, and "a" for operand data. A data packet B1 in FIG. 8B also stores node number #1 for destination information, "g" for a generation number and "b" for operand data.

The data packet A1 is applied to firing control unit with program storage FCP through the terminal IN of data driven type information processor PE via input/output control unit QJB. The instruction identification pipeline 91 of control unit FCP receives the data packet A1 and applies the same to address decode pipeline 92. Address decode pipeline 92 produces an address AD based on the destination information of the received data packet A1 and applies the produced address AD to FCP memory 20. The received data packet A1 is further applied to next order instruction fetch pipeline 93. A copy flag CPY stored in a region corresponding to a pointer address #0 addressed based on the address AD is read out. In this case, in response to the copying flag CPY being set, data corresponding to the pointer address #0 is read out, and a data packet having NOP for instruction information, the left input of node number #2 for destination information, and "a" for operand data, and a data packet having NOP for instruction information, the left input of node number #3 for destination information, and "a" for operand data are sequentially output. When the copying flag CPY is thus set, the two data packets are output by one addressing by such a copying processing.

Next order instruction identification pipeline 94, firing determination pipeline 95 and FC field update pipeline 96 sequentially receive the two data packets output from next order instruction fetch pipeline 93 each having NOP for instruction information, and directly outputs the packets to operation unit FP without data writing into the FC field in response to the operation instruction is the monominal operation instruction NOP.

Since operation unit FP operates the operand data according to the instruction information NOP of the received data packet, the received data packet is directly applied once again to control unit FCP through input/output control unit QJB. Thus, the left input data packets related to the nodes of node numbers #2 and #3 in FIG. 7 are collected.

Now, the instruction identification pipelines 91 of control unit FCP receives a data packet having NOP for instruction information, the left input of #2 for destination information, and "a" for operand data. The instruction information of the received data packet is decoded, and the received data packet is output to next order instruction fetch pipeline 93 via address decode pipeline 92. Address decode pipeline 92 outputs an address AD, and therefore a reset firing control flag VLD stored in a region corresponding to the pointer address #2 of FCP memory 20 is read out for output. A copying processing is performed based on a copying flag corresponding to address #2. By this copying processing, a data packet which stores next order instruction information *, next order destination information #4, and operand data "a" is output, followed by a data packet which stores next order instruction information *, next order destination information #5, and operand data "a". These two data packets are sequentially applied to next instruction identification pipeline 94.

Next instruction identification pipeline 94 upon identifying that the applied data packets store two-variable operation instructions *, outputs a flag VLD and received data packets. Firing determination pipeline 95 in response to the flag VLD being reset, determines that a queuing for a data packet will be performed and outputs the received data packets. In FC field update pipeline 96, the operand data "a" of the received data packet is stored as queuing operand data in an FC field corresponding to pointer address #2, and a corresponding firing control flag VLD is set.

Further, control unit FCP receives a data packet having NOP for instruction information, the left input of #3 for destination information, and "a" for operand data, and performs a series of processings including a copying processing as with the aforementioned case. Thus, in FC field update pipeline 96, the operand data "a" of the received data packet is written in an FC field corresponding to address #3 in FCP memory 20, sets queuing operand data, and a corresponding firing control flag VLD is set.

Thus, a state (non-firing state) is set in which in node numbers #2 and #3, one operand data queues for the other operand data related to node numbers #2 and #3 in FCP memory 20.

Then, data driven type information processor PE receives the data packet B1 in FIG. 8B and processes the packet in the same manner as the above-described input data packet A1 in control unit FCP, and therefore data packets having "b" for operand data related to the nodes of node numbers #2 and #3 are provided.

Control unit FCP receives and processes a data packet having NOP for instruction information, the right input of #2 for destination information, and "b" for operand data. At that time, since the firing control flag VLD corresponding to the address #2 of FCP memory 20 has already been set, it is determined that a firing takes place in pipelines 94 and 95. Therefore, in FC field update pipeline 96, queuing operand data a is read out from a region corresponding to the address #2 of FCP memory 20 and stored in the field F4 or F5 of the received data packet, and the received data packet is output. Thus, a data packet having * for instruction information, #4 for destination information, and "a" and "b" for operand data, and a data packet having* for instruction information, #5 for destination information, and "a" and "b" for operand data are output. At that time, the firing control flag VLD corresponding to the address #2 of FCP memory 20 is reset by pipeline 96.

Then, control unit FCP receives and processes a data packet having NOP for instruction information, the right input of #3 for destination information, and "b" for operand data in the same manner. Thus, a firing is detected in an FC field corresponding to the address #3 of FCP memory 20, and a data packet having + for instruction information, #6 for destination information, and "a" and "b" for operand data, and a data packet having + for instruction information, #7 for destination information, and "a" and "b" for operand data are output. At that time, also by FC field update pipeline 96, a firing control flag VLD corresponding to the address #3 of FCP memory 20 is reset in response to the firing detection.

Thus, two packets having two operands related to a binominal operation instruction are produced for each of node numbers #2 and #3 and provided to operation unit FP. Operation unit FP, for each of the two firing packets storing the operation instruction *, performs an operation processing to operand data "a" and "b" stored therein, stores the operation result x (=a * b) as operand data of each data packet and once again provides the data packets to control unit FCP. Similarly, operation unit FP operates operand data "a" and "b" stored in each of the two firing packets storing the operation instruction + and stores the operation result y (=a+b) to the operand data of each data packet and provides the data packets to control unit FCP.

Thus, in the data flow graph in FIG. 7, the operation processings of instruction nodes #0–#3 are completed, and the input data for the nodes of node numbers #4, #5, #6 and #7 will be obtained.

Then, in control unit FCP, data is sequentially read out from PS fields corresponding to pointer addresses #4, #5, #6, and #7 in FIG. 9 according to the destination information of the received data packets and the each read out data is formed into a data packet and sequentially output. All of these read out instructions are monominal operation instructions, and therefore these data packets are immediately and sequentially applied to operation unit FP. In operation unit FP, operation processings according to the operation instructions INC or DEC of node numbers #4, #5, #6 and #7 for the each received data packet are sequentially performed, and four data packets storing (x+1), (x–1), y+1), and (y–1), respectively for their operand data are sequentially output to control unit FCP. Thus, data for the right input of the node of node number #7, the left input of the node of node numbers #8, the right input of the node of node number #12, and the right input of the node of node number #10 in FIG. 7 is obtained.

Then, data is sequentially read out from PS fields corresponding to pointer addresses #8, #9, #12, and #10 in FIG. 9 according to the destination information of received data packets in control unit FCP. Among them, since constant flags CST corresponding to pointer addresses #8, #9, #10 are each in a set state, constant data K1, K2, and K3, respectively is read out from corresponding FC fields, and stored as operand data into each received data packet. Therefore, three unconditionally firing packets are produced and sequentially output to operation unit FP. The operand data (y–1) is formed into queuing operand data and stored in an FC field corresponding to address point #12, and a corresponding firing control flag VLD is set.

In operation unit FP, constant operation processings according to the operation instructions –, +, and * in instruction nodes #8, #9, and #10 in FIG. 7, are executed and three data packets storing "Z" (=K1 −(x+1)), "w" (=(x−1)+ K2), and "u" (=k3 * (y+1)), respectively for operand data are sequentially input to control unit FCP. Thus, input data having input data of the node of node number #11, the left input data of node #12 and input data of node #13 are obtained.

Thereafter, similarly, operation processings in node numbers #11, #12, and #13 in FIG. 7 are executed while accessing FCP memory 20 in control unit FCP, and the final operation results "v", "t", and "s" will be obtained.

As in the foregoing, by employing firing control unit with program storage FCP, FCP memory 20 serves both as the conventional program memory and the conventional queuing memory for firing packet producing, and peripheral circuit functions related to accessing of FCP memory 20 are simplified by six micropipeline stages in FIG. 2. Furthermore, by using a pointer address for accessing FCP memory 20 as an identification number allocated to an arc on a data flow graph, as can be seen from FIGS. 9 and 31A in comparison, the object size will be smaller than the conventional for the same program content.

FIG. 10 is a representation showing another example of the flow graph obtained from the program shown in FIG. 29.

FIGS. 11A and 11B are representations each showing a data packet input to data driven type information processor PE when execution of a program according to the flow graph in FIG. 10 is initiated.

FIG. 12 is a representation showing a storage content when an object module obtained from the flow graph in FIG. 10 is stored in FCP memory 20. In FIG. 12, a slanted line means "not used"; a "1" means set and a "0" means reset; a "$" means valid destination data value; and "¥" means queuing operand data value.

The flow graph in FIG. 10 is produced by analyzing the program in FIG. 29 with a compiler (or assembler) so that the object module can be loaded to FCP memory 20. The compiler analyzes the program in FIG. 29 and attaches node numbers in ascending order from the upper left portion to the lower right portion of the data flow graph, with the same node number being provided to nodes whose input arcs have the same transmission origin. Accordingly, the same node number #0 is attached to the node of the operation instruction, and the node of the operation instruction + having the same transmission origin node in FIG. 10. The same node number #1 is provided to the node of an operation instruction INC and the node of the operation instruction DEC having the same input node. Similarly, the same node number #2 is provided to each of the nodes of operation instruction DEC and operation instruction INC having the same input arc for their output arc from the operation instruction +.

FIG. 12 shows the storage content of FCP memory 20 which stores the object module of the flow graph in FIG. 10. FCP memory 20 shown in FIG. 2 includes a PS field and an FC field corresponding to each pointer address as addressed based on an address AD output from address decode pipeline 92 shown in FIG. 2. The PS field in FIG. 12 has a field structure as shown in FIG. 6, while the FC field has a field structure as shown in FIG. 5.

Now, an operation when a program is executed according to the flow graph in FIG. 10 in data driven type information processor PEk in FIG. 1 will be described in conjunction with FIG. 2 and FIGS. 10 through 12. Firing priority determination according to generation numbers will not be provided for purpose of simplifying the description.

A data packet A2 in FIG. 11A stores the left input of node number #0 for destination information, and "a" for operand data. A data packet B2 in FIG. 11B stores the right input of node number #0 for destination information, and "b" for operand data. Data packets A2 and B2 are sequentially provided to,firing control unit with program storage FCP via input/output control unit QJB through the input terminal IN of data driven type information processor PE.

The instruction identification pipeline 91 of control unit FCP receives the applied data packet A2 and then data packet B, and provides the packets sequentially to address decode pipeline 92.

Address decode pipeline 92 and next order instruction fetch pipeline 93 produce an address AD based on the destination information of input data packet A2, and then reads data corresponding to the pointer address #0 of memory 20. At the time of the reading, in response to that, a corresponding copying flag CPY is set, and a copying processing is performed to output two data packets. Among the two output data packets, one data packet stores * for instruction information, node number #1 for destination information, and "a" for operand data, and the other data packet stores + for instruction information, node number #2 for destination information, and "a" for operand data. Similarly, FCP memory 20 is accessed based on the destination information of received data packet B2 and two packets are output. Among the two output packets, one data packet stores * for instruction information, node number #1 for destination information, and "b" for operand data, and the other data packet stores + for instruction information, node number #2 for destination information, and "b" for operand data. Accordingly, by receiving data packet A2 and then data packet B2, the above-described four data packets are sequentially output from next order instruction fetch pipeline 93.

Next order instruction identification pipeline 94, firing determination pipeline 95, and FC field update pipeline 96 sequentially receive the two packets by received data packet A2 among the above-described four data packets and process the same. At that time, the instruction information of the received data packet is determined to be a two-variable operation instruction, the operand data "a" is written in an FC field corresponding to pointer address #0 to form a queuing operand, and a corresponding firing control flag VLD is set. By receiving the remaining two data packets by received data packet B2, a firing is detected, a firing control flag VLD corresponding to the pointer address #0 of FCP memory 20 is reset, and two firing packets storing the operand data "a" and "b" are output to operation unit FP. Among the two firing packets, one firing packet stores, for instruction information, node number #1 for destination information, while the other firing packet stores + for instruction information, and node number #2 for destination information.

Operation unit FP sequentially inputs the two firing packets, performs an operation processing to the operand data "a" and "b" stored therein according to the operation instruction, or + stored therein, and once again provides firing control unit with program storage FCP with a data packet having an operation result x (=a * b) for operand data, and a data packet having an operation result y (=a+b) for operand data.

By the above-described operation, input data for the nodes of node numbers #1 and #2 of the flow graph shown in FIG. 10 is obtained.

Thereafter, the circulation of a data packet from firing control unit with program storage FCP→operation unit FP→firing control unit with program storage FCP→ . . . , data packets storing final operation results v, t and s, respectively shown in FIG. 10 are obtained.

The size of the object module of the program according to the flow graph in FIG. 10 is reduced compared to that in FIG. 7, and the effective use of FCP memory 20 is achieved.

FIG. 13 is a representation showing how a multiplication instruction in the flow graph in FIG. 7 is executed according to the flow of a data packet.

FIG. 14 is a representation showing how a multiplication instruction in the data flow graph in FIG. 30 is executed according to the flow of data packets.

In FIG. 13, a multiplication instruction * is executed at the node of node number #12, and since the nodes of node numbers #9 and #6 are connected through arcs, the node of node number #12 has output data of these two nodes for input data, in other words for operand data. Accordingly, until the processing moves to the node of node number #12 from the nodes of node numbers #9 and #6, the data processing in firing control unit with program storage FCP in FIG. 1 is executed once.

In FIG. 14, a multiplication instruction * is executed at the instruction node of node number #19. The node of node number #19 connects the nodes of node numbers #16 and #12 through arcs, and has the output data of the nodes of node numbers #16 and #12 for input data, in other words for operand data. The multiplication instruction * of node number #19 is executed at operation unit FP in FIG. 26, and therefore until the processing moves to the node of node number #19 from the nodes of node numbers #16 and #12, the processing in program storage unit PS is executed twice and the processing in firing control unit FC once in FIG. 26.

As can be seen from comparison between the two flow graphs in FIGS. 13 and 14, for executing multiplication instruction of the same content, in the case of the present embodiment, only memory accessing processing is executed twice for FCP memory 20, while in the case of conventional example, as illustrated in FIG. 14, memory accessing processing is performed twice in program storage unit PS and twice in firing control unit FC. Therefore, according to the method of controlling execution of a program in data driven type information processor PE according to the embodiment, time required for executing the program can be reduced significantly.

FIG. 15 is a table showing results of comparison of the sizes of object modules shown in FIGS. 9, 12, and 31A for every item. The table in FIG. 15 represents items for comparison horizontally, and the names of object modules described with reference numerals in the vertical direction. The comparison items include the number of binominal operation instruction nodes, the number of monominal operation instruction nodes, the number of destination arcs, object sizes and the number of queuing regions used. The number of binominal operation instruction nodes is the largest 12 in the case of the module in FIG. 31A, because two nodes are used for one binominal operation instruction. The numbers of monominal operation instruction nodes are not much different between these three modules. The number of destination arcs is the number of nodes described in the destinations (1) and (2) of an FC field, and that of the module in FIG. 9 is the smallest. An object size is a value produced by summing the number of binominal operation instruction nodes, the number of monominal operation instruction nodes, and the number of destination arcs for every module, and that of the object module in FIG. 31A is the largest.

The number of queuing regions for use is the number of regions for use in an FC field, and that of the object module in FIG. 12 is the largest. The size of the address space of a queuing memory is set correspondingly to the address space of an FC field. Stated differently, since the size is set correspondingly to the number of destination arcs, if the efficiency of use of a queuing memory is calculated (as the number of queuing regions for use/the number of destination arcs), that of the module in FIG. 9 is 5/12, that of the module of FIG. 12 is 6/18, that of the module in FIG. 31A is 3/18. In other words that of FIG. 9 is about four times as large as that of FIG. 31A, and that of FIG. 12 is about three times as large as that of FIG. 31A.

According to data driven type information processor PE, the use of a single memory for a memory for program storage and a memory for operand data queuing makes it possible to reduce the size of the processing apparatus. Furthermore, the memory is shared for program storage and operand data queuing, and therefore peripheral circuitry associated with the memories is unified. The number of processing stages is reduced as a result and time required for executing a program is reduced. As illustrated in FIG. 15, the size of an object module is reduced. Furthermore, since every time data is read out from FCP memory 20, at least one set of instruction information and destination information constituting a data flow program is read out, the size of an object module in a data flow program stored in the apparatus can be reduced. This reduces the number of program data read out and shortens time for program execution including accessing processing to the storage unit.

Now, the second to fourth embodiment of the invention will be described in detail in conjunction with the drawings. In a data driven type information processor applied to each embodiment, a method of controlling program execution is employed by which the functions of program storage unit 5 and firing control unit 6 are unified into a single function.

FIG. 16 is a block diagram showing a structure of a data driven type information processor applied to the second to fourth embodiments of the invention.

In FIG. 16, data driven type information processor 10 includes a firing control/program storage unit (hereinafter referred to as FCP control unit) 1, an operation unit 2, a branch portion 3, and a junction portion 4. Since operation unit 2, branch portion 3, and junction portion 4 have the same structure and function as those of the conventional example described in conjunction with FIG. 32, the detailed description thereof will not be provided. It is noted that the field structure of a data packet in data driven type information processor 10 is the same as that shown in FIG. 33, and therefore will not be described here.

FCP control unit 1 functions both as program storage unit 5 which stores a data flow graph program and firing control unit 6 having a memory for queuing operand data according the conventional example, and has a single memory space shared by both function.

FIG. 17 is a block diagram showing the structure of FCP control unit 1. FCP control unit 1 includes transfer control portions 11–13, an FCP memory 14, a packet erasing portion 15, a junction control portion 16, a selector 17 and registers 18, 19, 21, and 22.

Each of registers 18–22 is formed of a flipflop circuit having a width of a plurality of bits. Transfer control portions 11–13 utilize the clock pulses CP1–CP3, respectively to control the input operation of corresponding registers 18–22, and also output transfer pulses TP1–TP3 for transferring data stored in the corresponding registers to circuits after the next stage.

FCP memory 14 is a memory which includes a storage region for program and a storage region for queuing operand data to be paired with preceding operand data. As will be described later, in FCP memory 14, irrespective of the presence/absence of the above-described copying processing or constant data processing, the number of fetching program data is always one. By the one fetching, two program data are constantly read out irrespective of the validity/invalidity. One of the read out program data is output to register 19 and the other to register 21.

Transfer control portions 12 and 13 supply the clock pulses CP2 and CP3, respectively to control registers 19 and 21 to input applied data. Transfer control portions 12 and 13 output the transfer pulses TP2 and TP3 as well as the clock pulses CP2 and CP3.

Input data X and a generation number GN# stored in register 18 are directly output to registers 19 and 21. A next order instruction code and a next order node number are read out from FCP memory 14 by addressing based on the node number ND# and the address portion of the generation number GN# stored in register 18 are stored in registers 19 and 21, respectively as an instruction code opc and a node number ND#. Queuing data read out from memory 14 is stored in registers 19 and 20 as a constant or queuing data Z. A copying flag CPY read out from memory 14 is output exclusively to register 19.

Transfer control portions 12 and 13 apply the clock pulses CP2 and CP3 to registers 19 and 21, respectively in response to the input of the transfer pulse TP1 applied from transfer control portion 11, and registers 19 and 21 in turn input data applied from-registers 18 and memory 14.

Packet erasing portion 15 controls whether or not to apply the transfer pulse TP2 applied from transfer control portion 12 to junction control portion 16 in response to the state of the copying flag CPY stored in register 19.

Junction control portion 16 inputs the asynchronously applied transfer pulses TP3 and TP2, arranges them in a time series for output to operation unit 2, and outputs a clock pulse CP4 to register 22. At that time, junction control portion 16 outputs to selector 17 an identification signal SL identifying whether each pulse output to operation unit 2 and register 22 is in response to the transfer pulse TP2 or the transfer pulse TP3.

Selector 17 selects and outputs the output data of register 21 if the state of applied identification signal SL corresponds to the pulse TP3, and conversely selects and outputs the output data of register 19 to register 22 if the state corresponds to the pulse TP2.

Junction control portion 16 applies the clock pulse CP4 to register 22 in response to the input of the transfer pulse TP3. Since register 22 inputs and outputs data stored in register 19 or 21 output from selector 17, a data packet storing in a prescribed field each data stored in register 22 is output from FCP control unit 1.

Thus, in FCP control unit 1, by the one fetching operation to FC memory 14 (program memory), two data packets are output, and therefore feedback control for sequentially fetching a second data packet following a first data packet as conventionally practiced is not necessary. The control of the presence/absence of copying of a data packet is executed in a forward control for not erasing/erasing according to a read out copying flag, and therefore the mechanism for fetching a program from FCP memory 14 can be extremely readily implemented as compared to the conventional example.

FIG. 18 is a representation showing part of a content stored in FCP memory 14 according to the second embodiment of the invention.

Referring to FIG. 18, a plurality of program words are stored in FCP memory 14, and each program word stores a first set of data, a second set of data, and the non-address portion of a generation number. The first set of data further includes a firing control flag VLD, a copying flag CPY, a constant flag CNT, an instruction code, a node number, a left/right identification code L/R and constant data or queuing data. The second set of data includes a constant flag CNT, an instruction code, a node number, a left/right identification code L/R and constant data or queuing data. It is noted that "–" indicates invalid data in each program word.

In the second embodiment, the contents of program words stored in FCP memory 14 are classified depending upon the state of the copying flag CPY, the state of the two constant flags CNT and whether one or two instruction codes are a 1-input instruction or a 2-input instruction in the program word. In the classification, illustrated in FIG. 18 are 6 representative kinds of program words 100–105.

The program word 100 is a program word of "1-input instruction" in which the copying flag CPY and the first set constant flag CNT are both "0", and the first set instruction code is a 1-input instruction. If the word is fetched by addressing based on the address portion of the generation number and node number of a data packet input to FCP control unit 1, the instruction code node number, and identification code L/R of the fetch first set of data are written in the fields f2, f4, and f5, respectively of the input packet, and the input packet is output from FCP control unit 1. Thus, in the case of "1-input instruction", since it is not necessary to produce an operand data pair, a queuing processing is not performed.

The program word 101 is a program word of "a 2-input instruction with a constant", the copying flag CPY is "0", and the first set constant flag CNT is "1". In this case, the first set instruction code is limited to 2-input instruction. If the instruction is fetched from FCP memory 14 by addressing based on the address portion of the generation number and node number of a data packet input to FCP control unit 1, an operand data pair is produced by operand data in the input packet and constant data read out from FCP memory 14, the produced operand data pair is written in the fields f6 and f7 of the input packet, and the input packet is output. At that time, as for the value of the left/right operand data of the output packet, if the left/right identification code L/R of the input packet is "L", the operand data of the input packet is stored in field f6 as left operand data, and the constant data read out from FCP memory 14 is stored in field f7 as right operand data. Meanwhile, if the identification code L/R of the input packet is "R", the left operand data and right operand data of the output data packet are set opposite to the above-described case of "L". For the instruction code, node number, and left/right identification code L/R of the output packet, the instruction code, node number, and left/right identification code L/R of the first set of data fetched from FCP memory 14 are set, respectively. It is noted that for the generation number of the output packet, the generation number of the input packet is set as it is.

As described above, by simply fetching a "2-input instruction with a constant" from FCP memory 14, a data packet firing using constant data can be provided, two fetching operations for constant data processing and an operation of queuing constant data to form an operand data pair through a queuing memory which are conventionally practiced are omitted.

The program word 102 is a program word for "instruction with copying", the copying flag CPY is "1", and one of constant flags CNT is "1". In this instruction, the instruction code of the set whose constant flag CNT "1" is limited to a 2-input instruction. The instruction code of the set whose constant flag CNT is "0" is limited to a 1-input instruction. If the instruction is fetched from FCP memory 14 by addressing based on the address portion of the generation number and the node number of a data packet input to FCP control unit 1, the same processing as to "2-input instruction with a constant" corresponding to the above-described program word 101 is performed to the set of data whose constant flag CNT is "1". To the set of data whose constant flag CNT is "0", the same processing as to "1-input instruction" corresponding to the above-described program word 100 is performed.

Accordingly, by simply fetching the instruction from FCP memory 14, two data packets, a data packet storing a 1-input instruction and a data packet firing utilizing constant data are simultaneously provided.

The program word 103 is a program word for "2-input instruction without a constant", the copying flag CPY and the constant flags CNT of the first set are both 0, and the instruction code of the first set is a 2-input instruction. In this case, depending on the states of corresponding firing control flags VLD, the content of processing of FCP control unit 1 differs. The VLD read out from FCP memory 14 by addressing based on the address portion of the generation number and the node number of a packet input to FCP control unit 1 is "0", the operand data and the non-address portion of the generation number of the input packet are written as a first set of queuing data and the non-address portion of a generation number in the addressing region of FCP memory 14, and then a corresponding flag VLD is set to "1". At that time, a data packet is not output from FCP control unit 1. Meanwhile, if the flag VLD is "1", it is determined whether or not the non-address portion of the generation number of the input packet and the non-address portion of the generation number written in the addressing region coincide. If a coincidence is found, a data pair is produced by the operand data of the input packet and the queuing data read out from the addressing region, and a data packet storing the produced data pair is output. At that time, for the value of the left/right operand data of the output packet, if the identification code L/R of the input packet is "L", the operand data of the input packet is set as left operand data in the field f6 of the output packet and the queuing data read out from FCP memory is set as right operand data in the data field f7 of the output packet. Meanwhile, if the identification code L/R of the input packet is "R", setting of the left/right operand data of the output packet are performed opposite to the above-described case of "L". For the instruction code node number, and left/right identification code L/R of the input packet, instruction code, node number, and left/right identification code L/R of the fetched first set are set, respectively. The generation number of the input packet is set as the generation number of the output packet. At that time, together with packet output, the flag VLD corresponding to the addressing region of FCP memory 14 is set to 0.

Meanwhile, if the non-address portion of the generation number of the input packet does not agree with the non-address portion of the generation number stored in the addressing region of FCP memory 14, the through flag SF of the input packet is set to "1", and the input packet is output as it is. The data packet with its through flag SF being set to "1" is not subject to any processing in the function portions other than FCP control unit 1 and is once again input to FCP control unit 1. The data packet with its through flag SF being set to "1" is set (reset) to "0" when a data pair is detected in FCP control unit 1, but until then continue to circulate through the function portions with the flag state being maintained.

Accordingly, if the instruction is fetched from FCP memory 14, since the state of a flag VLD corresponding to the instruction is determined, and one of processings of obtaining a firing data packet or queuing for input of operand data to be paired with for producing a firing packet is performed in FCP memory 14 depending upon the result of determination, FCP control unit 1 functions as conventional program storage unit and a firing control unit.

The program word 104 is the program word for "2-input instruction (with copying)" the copying flag CPY is "1", and one of the constant flags CNT is "0". In this case, two sets of instruction codes are limited to 2-input instructions. If the instruction is fetched from FCP memory 14 by addressing based on the address portion of the generation number and the node number of the input packet, FCP control unit 1 determines the state of the flag VLD stored in the instruction first. If the flag VLD indicates "0", the operand data and the non-address portion of the generation number of the input packet are written in the addressing region of FCP memory 14 as queuing data of a first set and the non-address portion of a generation number, and a corresponding flag VLD is set to "1". At that time, a data packet is not output from control unit 1.

The read out flag VLD of FCP memory 14 is "1", it is determined whether or not the non-address portion of the generation number of the input packet agrees with the nonaddress portion of the generation number written in the addressing region of FCP memory 14.

If there exist, an agreement, two data packets storing a data pair formed of operand data in the input packet and the queuing data read out from FCP memory 14 are output. At that time, if the identification code L/R of input packet is "L", for the values of the left/right operand data of each of the output packets, the operand data of the input packet is set in the field f6 of the output packet as left operand data and the queuing data read out from FCP memory 14 is set in the field f7 of the output packet as right operand data. Meanwhile, if the identification code L/R of the input packet is "R", setting of left/right operand data for the output packet is performed opposite to the described above case of "L". For the instruction codes, node numbers and identification code L/R of both output packets, instruction codes, node numbers, and identification codes stored in the fetched first set of data and second set of data are set, respectively. When these two packets are output, a flag VLD corresponding to the addressing region of FCP memory 14 is set to "0".

Meanwhile, if the non-address portion of the generation number of the input packet and the non-address portion of the generation number written in the addressing region of the FCP memory 14 do not agree, the through flag SF of the input packet is set to "1", and the input packet is output as it is. The data packet with its through flag SF being set to "1" is thereafter processed in the respective processing portions in the same manner as the case of the above-described program word 103.

If the instruction 104 is fetched from FCP memory 14, the state of a firing control flag VLD stored in the instruction is determined first, a firing is detected depending upon the result of the determination, and either processing for obtaining two different packets storing the same operand data pair at the same time or queuing for input of operand data to be paired with to produce two firing packets in memory 14 is performed.

The program word 105 is a program word for "mixture of 2-input instruction without a constant/instruction with constant", the copying flag CPY is "1", and one of the constant flags CNT is "1". Two sets of instruction codes are both limited to 2-input instructions. If FCP control unit 1 fetches the instruction from FCP memory 14 by addressing based on the address portion of the generation number and the node number of an input packet, a firing control flag VLD stored in the memory is determined first. If the firing control flag VLD is "0", the non-address portion of the generation number and the operand data of the input packet are written as a non-address portion of the generation number and data for queuing a set of data with the constant flag CNT of 0 in of the addressing region of FCP memory 14, and then a corresponding flag VLD is set to "1". At that time, FCP control unit 1 does not output a data packet.

Meanwhile if the flag VLD is "1", it is determined whether or not the non-address portion of the input data packet agrees with the non-address portion of the generation number written in the addressing region. If an agreement is found, a data packet storing a data pair produced from the operand data of the input packet and the queuing data of the set of data whose constant flag CNT read out from the addressing region of FCP memory 14 is "0" is output, and a data packet storing a data pair produced from the operand data of the input packet and the constant data of the set whose constant flag CNT read out from the addressing region of FCP memory 14 is "1" is output. At that time, for the values of the left/right operand of both output packets, if the code L/R of the input packet is "L", the operand data of the input packet is set in the field f6 of the output packet as left operand data, and the data read out from the addressing region of FCP memory 14 (queuing data or constant data) is set in the field f7 of the output packet as right operand data. Meanwhile, if the identification code L/R of the input packet is "R", setting of the left/right operand data of the output packet is performed opposite to the above-described case of "L". For the instruction codes, node numbers, left/right codes L/R of both output packets, instruction codes, node numbers, codes L/R stored in fetched corresponding sets of data are set, respectively. For the generation numbers of both output packets, the generation number of the input packet is set as it is. When both output packets are produced, a flag VLD corresponding to the addressing region of FCP memory 14 is set to "0".

If the non-address portion of the generation number of the input packet does not agree with the non-address portion of the generation number written in the addressing region of FCP memory 14, the input packet has its through flag SF set to "1" and output. Processings to a data packet with its through flag SF set "1" is the same as the above-described case of "2-input instruction without a constant".

As described above, the provision of the FCP control unit 1 permits conventional program storage function and queuing function for queuing for an operand data pair to be unified through FCP memory 14, and the number of fetching a program word from FCP memory 14 is always one irrespective of the presence/absence of conventional copying processing operation or constant data processing operation. This also permits the number of program words which can be stored in FCP memory 14 to be constant, in other words, the number of program of program steps to be constant, irrespective of the contents of programs (the presence/absence of constant data processing, the presence/absence of copying processing).

FIGS. 19A–19C are representations each showing a method of addressing FCP memory 14 and a type of storing a program in the memory.

FIG. 20 is a representation showing one example of the structure of a program word including a flag for inverting a left/right identification code L/R stored in a data packet input to FCP control unit 1.

FIGS. 21A–21D are representations for use in illustration of instruction newly supported in the second embodiment of the invention.

In the above-described second embodiment, FCP memory 14 is accessed by addressing based on the address portion of the generation number and the node number of an input packet. This is for utilizing part of a generation number for an address portion for memory accessing and reducing a storage region for storing program word consumed in FCP memory 14 in the case in which data packets storing a plurality of different generation numbers are processed in parallel and separately in a data driven type information processor. If, for example, a capacity larger than the value of the product of the number of total steps (words) of a data flow program and the number of different generation numbers executed at the same time is prepared, such addressing utilizing parts of a generation number will not be necessary. In such a case, the region for storing the non-address portion of a generation number can be removed from each program word as illustrated FIG. 18, the size (width) per program word can be reduced, writing of the non-address portion of a generation number in FCP memory 14 will not be necessary, detection of agreement utilizing the non-address portion of the generation number in order to detect an operand data pair will not be necessary, and therefore the method of controlling execution of FCP control 1 will be more simplified.

For example, it is assumed that the bit width of a node number stored in an input packet in FCP control unit 1 is 4 bits, and the bit width of a generation number stored in the input packet is 2 bits. As illustrated in FIG. 19A, if the node number and generation number of the input packet are all utilized as address for accessing FCP memory 14, program data formed of 16 program words accessible utilizing a 4-bit node number for every different generation number in FCP memory 14. In this case, it is necessary to prepare at least a storage capacity corresponding to 64 program words in FCP memory 14, but since paired data detection processing utilizing part (non-address portion) of the generation number is not necessary, each program word size (width) can be reduced as compared to that shown in FIG. 18.

As illustrated in FIG. 19B, when the node number and the address portion (1 bit) of the generation number of the input packet is utilized as an address for accessing for FCP memory 14, program data formed of 16 words must be separately stored for each of different address portions of different generation numbers. It is necessary to prepare at least a storage capacity corresponding to 32 program words in FCP memory 14. The number of program words stored in this case is reduced to ½ that shown in FIG. 19A.

As illustrated in FIG. 19C, if the only the node number of the input data packet is utilized as an address for accessing FCP memory 14, only a program accessed utilizing a node number (4 bit) for every different generation number need only be stored. In such a case, FCP memory 14 needs only to prepare a storage capacity ¼ times as large as that in FIG. 19A for its program storage capacity. However, if processings related to program data having the same node number between a plurality of data packets having different generation numbers are requested, the processings are performed on a packet-by-packet basis.

A flag SWP indicating whether or not to invert the left and right attribute of the operand data of an input packet may be provided for instruction code, node number, identification code L/R, and constant/queuing data of a first or second set as illustrated in FIG. 20. By the provision of the flag SWP, among output packets data-pair-detected and produced, an output packet with the value of its flag SWP corresponding to "1" has its left operand data exchanged with right operand data. If the flag SWP is "0", it operates just in the same manner as the case without the flag SWP.

Referring to FIGS. 21A–21D, instructions newly supported by the second embodiment of the invention will be described in comparison with conventional corresponding instructions.

Figure 21A:
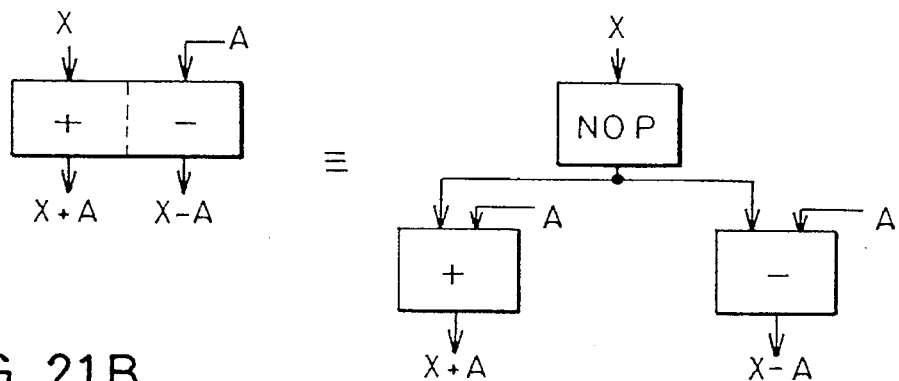

As illustrated in FIG. 21A, when two different instruction codes with an operand data pair in common are executed, according to a conventional technique, program storage unit 5 should be fetched three times in order to use three kinds of instruction codes "NOP", "+" and "−". However, according to the present embodiment, since the instruction code "+" and the instruction code "−" are stored as one program word in memory 14, the instruction code can be executed by one fetching.

Figure 21B:
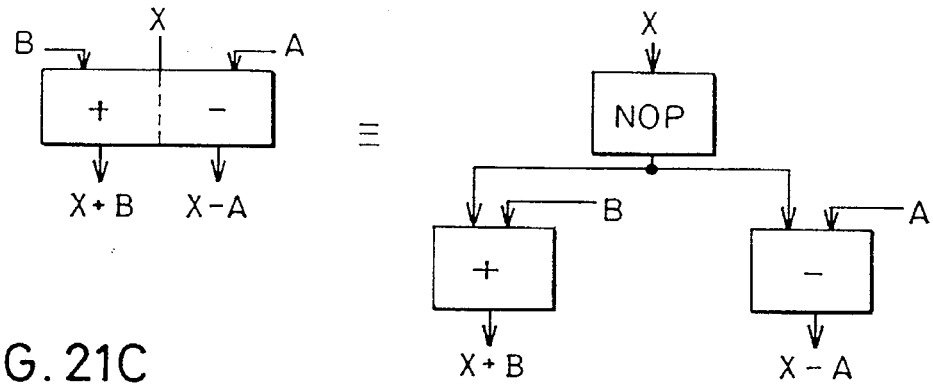
Figure 21C:
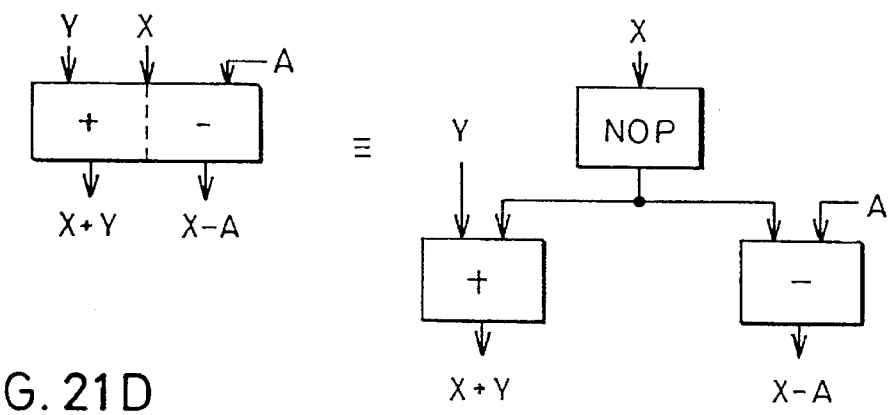
Figure 21D:
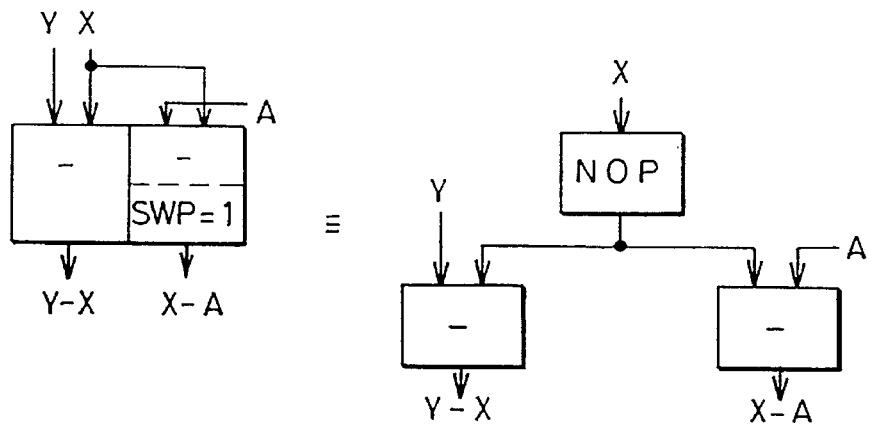

As illustrated in FIGS. 21B and 21C, two different instruction codes having only one operand data in common is executed. Three instruction fetches were conventionally necessary, but according to the present embodiment, only one instruction fetch is necessary. As illustrated in FIG. 21D, when the left/right attribute of one operand data are inverted, three instruction fetches were conventionally necessary. However, according to the present embodiment, by the provision of the left/right attribute inversion flag SWP, only one instruction fetch is necessary.

As illustrated in FIGS. 21A–21D, when the same processing content is executed, three program steps conventionally necessary are reduced to one program step according to the present embodiment.

Now, the third embodiment will be described.

A data driven type information processor according to the third embodiment is different from the second embodiment only in the structure of program words stored in FCP memory 14, and the other structure and operation thereof are the same as those of the second embodiment.

FIG. 22 is a representation showing part of a storage content stored in FCP memory 14 according to the third embodiment of the invention.

Referring to FIG. 22, a plurality of program words are stored in FCP memory 14. Each program word includes a first set of data, a second set of data, constant data or queuing data, a firing flag VLD and the non-address portion of a generation number. The first set of data further includes a constant flag CNT, a copying flag CPY, an instruction code, a code number and a left/right identification code L/R. The second set of data includes an instruction code, a node number, and a left/right identification code L/R. The content of program words stored in FCP memory 14 is classified into a plurality of kinds depending upon the constant flags CNT, copying flags CPY and instruction codes, and FIG. 22 sets forth representative program words 200–205. In the figure, "−" indicates invalid data.

The program word 200 is a program word of "1-input instruction", its constant flag CNT and copying flag CPY are both "0", and its instruction code is a 1-input instruction. If the instruction is fetched from FCP memory 14 by addressing based on the address portion of the generation number and node number of a data packet input to FCP control unit 1, the fetch instruction code, node number, and identification code L/R are written in prescribed fields of the input packet and the input packet is output.

The program word 201 is a program word for "1-input instruction with copying", its constant flag CNT is "0", its copying flag CPY is "1", and the instruction codes stored in the first and second sets of data are both a 1input instruction. If the instruction is fetched from FCP memory 14 by addressing based on the address portion of the generation number and node number of a data packet input to FCP control unit 1, two packets are output. One of the output packets is stored with the instruction code, node number, and codes L/R of the fetch first set in corresponding fields of the input packet, and the other output packet is stored with the instruction code, node number, and code L/R of the fetch second set in corresponding fields of the input packet. Thus, the two different data packets having the same operand data can be provided at a time by a single fetching operation to FCP memory 14.

The program word 202 is a program word for "2-input instruction with constant", its constant flag CNT is "1" and copying flag CPY is "0". The instruction code in this case is limited to a 2-input instruction. If the instruction is fetched from the FCP memory 14 by addressing based on the address portion of the generation number and node number of a data packet input to FCP control unit 1, a data pair is produced from the operand data of the input packet and constant data read out from FCP memory 14, and a data packet storing the produced data pair is output. At that time, for the value of left/right operand data in the output data packet, if the identification code L/R of the input packet is "L", the operand data of the input packet is set in the field f6 of the output packet as left operand data, and the constant data read out from FCP memory 14 is set in the field f7 of the output packet as right operand data. If the code L/R of the input packet is "R", the left/right operand data of the output packet is set opposite to the above-described case of "L". For the instruction code, node number, and identification code L/R of the output packet the fetch instruction code, node number and its identification code L/R are set, respectively, and the generation number of the input packet is set for the generation of the output packet as it is. Thus, when a 2-input instruction utilizing the constant data is read out from FCP memory 14, a firing is detected by one program fetching and a data packet storing a pair of operand data can be provided.

The program word 203 is a program word for "2-input instruction with constant (copying present)", its constant flag CNT and copying flag CPY are both "1". In this case, at least one of the two sets of instruction codes is limited to 2-input instruction. If the instruction is fetched from FCP memory 14 by addressing based on the address portion and node number of the generation number stored in the data packet input to FCP control unit 1, an operand data pair is produced by the operand data in the input packet and constant data read out from the addressing region of FCP memory 14, and two data packets storing the produced operand data pair are output. At the time, for the values of the left/operand data in both output packets, if the identification code L/R of the input packet is "L", the operand data in the input packet is set in the field f6 of each output packet as left operand data, and the constant data read out from the addressing region of FCP memory 14 is set in the field f7 of each output packet as right operand data. Meanwhile, if the code L/R of the input packet is "R", setting of the left/right operand data of each output packet is performed opposite to the above-described case of "L". Instruction code, node number, and code L/R of fetch one set is set for the instruction code, node number, and code L/R of one output packet, respectively, while instruction code, node number, and code L/R of fetch the other set is set for the instruction code, node number and code L/R of the other output packet, respectively. The generation number of the input packet is set for the generation numbers of both output packets. As described above, the two different data packets having the same operand data pair (including constant data) can be obtained at a time by a single fetching operation to FCP memory 14.

The program word 204 is a program word for "2-input instruction without constant" in which its constant flag CNT and copying flag CPY are both "0" and its instruction code is a 2-input instruction. If the instruction is fetched from FCP memory 14 by addressing based on the address portion and node number of the generation number of a data packet input to FCP control unit 1, the state of its flag VLD is determined first. If the flag VLD is "0", the operand data and non-address portion of a generation number in the input packet are written in the addressing region of FCP memory 14 as queuing data and the non-address portion of the generation number, respectively, and then a corresponding flag VLD is set to "1". At the time, a data packet is not output from FCP control unit 1.

If the flag VLD of the addressing region of FCP memory 14 is "1", a determination of whether or not the non-address portion of the generation number of the input packet agrees with the non-address portion of the generation number written in the addressing region is made. If an agreement is found, a data pair is produced by the operand data stored in the input packet and the queuing data read out from the addressing region, and a data packet storing the produced pair is output. At that time, for the value of the left/right operand data in the output packet, if the code L/R of the input packet is "L", the operand data in the input packet is set in the field f6 of the output packet as left operand data, and the queuing data read out from the addressing region of FCP memory 14 is set in the field f7 of the output packet as right operand data. Meanwhile, if the code L/R of the input packet is "R", setting of the left/right operand data of the output packet is performed opposite to the above-described case of the "L". For the instruction code, node number and identification code L/R of the output packet, the instruction code, node number, and identification code L/R fetched from FCP memory 14 are set, respectively. The generation number of the input packet is set for the generation of the output packet. When the output packet is transmitted, the flag VLD stored in the addressing region of the FCP memory 14 is set to "0".

If the non-address portion of the generation number of the input packet does not agree with the non-address portion of the generation number written in the addressing region of FCP memory 14, the through flag SF of the input packet is set to "1" and the input packet is output as it is. The data packet with its through flag SF being set to "1" is not subject to any processing in each processing portion thereafter, and is input once again to FCP control unit 1. The data packet with its through flag SF being set to "1" has its flag SF set to "0" (reset) if operand data to be paired therewith is detected in FCP control unit 1, but until then, the through flag SF circulates through the data driven type information processor with its through flag SF being "1". Thus, since the region for 1 program word of FCP memory 14 is used both for conventional region for storing one program data and for queuing operand data to be paired therewith, only a single fetching operation of program data from FCP memory 14 is necessary.

The program word 205 is a program word for "copying present 2-input instruction", in which its constant flag CNT is "0", its copying flag CPY is "1", and at least one of stored two sets of instruction codes is a 2-input instruction. FCP control unit 1 fetches the program word from FCP memory 14 by addressing based on the address portion and node number of the generation number of an input packet. If a flag VLD in the fetch program word is "0", the operand data and non-address portion of the generation number in the input packet are written in the addressing region of FCP memory 14 as queuing data and the non-address portion of a generation number, and then a corresponding flag VLD is set to "1". At that time, a data packet is not output from FCP control unit 1.

If the flag VLD stored in the fetched program word is "1", a determination is made as to whether or not the non-address portion of the generation number in the input packet agrees with the non-address portion of the generation number included in the fetched program word. If an agreement is found, a data pair is produced by the operand data in the input packet and the queuing data stored in the fetch program word, and two different data packets storing the produced operand data pair are output. At the time, for the value of left/right operand data in each output packet, if the code L/R of the input packet is "L", the operand data in the input packet is set in the field f6 of each output packet as left operand data, and the queuing data stored in the fetch program word is set in the field f7 of each output packet as right operand data. Meanwhile, if the code L/R of the input packet is "R", setting of left/right operand data in each output packet is performed opposite to the above-described case of "L". For the instruction code, node number, and identification code L/R of one of the output packets, the instruction code, node number and code L/R stored in the first set of data in the fetched program word are set, respectively, and for the instruction code, node number, and code L/R of the other output packet, the instruction code, node number, and code L/R stored in the second set of data in the fetch program word are set, respectively. The generation number of the input packet is set for the generation number of each output packet. When both output packets are output, the flag VLD stored in the addressing region of FCP memory 14 is set to "0".

If the non-address portion of the generation number of the input packet does not agree with the non-address portion of the generation number stored in the fetched program word, the through flag SF of the input packet is set to "1", and the input packet is output as it is. A processing to a data packet with its through flag SF being set to "1" is the same as the above-described "2-input instruction without constant".

As described above, by the method of controlling program execution according to the third embodiment, the functions of conventional program storage unit and firing control unit are combined as is the case with the second embodiment, and the storage region for storing programs and the storage region for queuing an operand data pair are implemented in a single region utilizing FCP memory 14.

Also in this embodiment, as is the case with the above-described second embodiment, FCP memory 14 is accessed by addressing based on the address portion of the generation number and node number of an input packet. This is for saving the storage capacity of a program word in memory 14 utilizing the non-address portion of a generation number if data packets storing a plurality of different generation numbers are simultaneously and separately processed in the data driven type information processor. If for example, a storage capacity larger than the product of the total step number in a program and the number of simultaneously executable generation numbers can be prepared as the size of the FCP memory 14, a coincidence detection utilizing the non-address portions of the generation numbers is not necessary. Accordingly, each program word in FIG. 22 may be implemented as a program word removed of the region for storing the non-address portion of a generation number. In such a case, size, (width) per 1 program word of FCP memory 14 can be reduced, it is not necessary to write the non-address portion of the generation number of an input packet in FCP memory 14, and a processing for detecting a data pair utilizing the non-address portion of the generation number will not be necessary, so that the method of controlling execution in FCP control unit 1 will further be simplified (see FIG. 19).

When a program is processed according to the method of controlling execution of the embodiment, while conventionally an operation utilizing the same constant data to two different instruction codes as illustrated in FIG. 21A requires three program words, the program can be processed with only 1 program word according to the embodiment. Furthermore, it is possible to provide a flag SWP indicating whether or not to invert the left/right attribute of operand data stored in an input packet with respect to instruction code/node number pair in first or second set of data in each program word stored in FCP memory 14. The flag SWP is stored, for example, in the head 1 bit of an instruction code of a first or second set in one program word shown in FIG. 23.

FIG. 24 illustrates one example of an instruction implemented utilizing such a left/right attribute inverting flag SWP in the third embodiment. In the case of "2-input instruction with constant (with copying)" or "2-input instruction with copying" in FIG. 22, if the value of the flag SWP provided to the second set of data of the program word is "1" left operand data and right operand data are exchanged for the operand data pair of the data packet output with respect to the second set of data of the program word among the produced two output packets. Meanwhile, if the flag SWP is "0", it operates just in the same manner as the case without providing the flag SWP. In FIG. 24, the flag SWP with respect to the second set of data of the fetch program word is illustrated, and the same applies to the flag SWP with respect to the first set of data of the fetched program word.

Now, the fourth embodiment of the invention will be described.

A data driven type information processor according to the fourth embodiment is substantially identical to the first and second embodiments except that the structure of program words stored in its FCP memory 14 is different, and the other structure and operation are the same as those of the first and second embodiments. FIG. 23 illustrates part of a storage content stored in FCP memory 14 according to the fourth embodiment of the invention.

Referring to FIG. 23, each program word stored in FCP memory 14 according to the fourth embodiment includes a first set of data, a second set of data, constant data or queuing data, a firing control flag VLD, and the non-address portion of a generation number. The first set of data includes a constant flag CNT, a copying flag CPY, an instruction code, a node number and a left/right identification code L/R, while the second set of data includes a node number and a left/right identification code L/R. Contents stored in program words are classified into a plurality of kinds depending upon the state of constant flag CNT, the state of copying flag CPY and whether the instruction code is a 1-input instruction or 2-input instruction. FIG. 23 illustrates five representative kinds of program words 300–304. In FIG. 23 "–" indicates invalid data.

A program word 300 is a program word for "1-input instruction", and its constant flag CNT and copying flag CPY are both "0", and its instruction code are a 1-input instruction. If FCP control unit 1 fetches the instruction from FCP memory 14 by addressing based on the address portion of the generation number and node number of an input packet, the instruction code, node number and identification code L/R stored in the first set of data of the instruction are written in prescribed respective fields of the input packet, and the input packet is output.

A program word 301 is a program word for "1-input instruction with copying", and its constant flag CNT is "0", its copying flag CPY is "1", and its instruction code is a 1-input instruction. If FCP control unit 1 fetches the instruction from FCP memory 14 by addressing based on the address portion of the generation number and node number of an input packet, two output packets are produced and then output. The fetched instruction code, generation number of the input packet and operand data in the input packet are written in both output packets. The node number and code L/R stored in the first set of data of the fetched instruction are written in one of the output packets, and the node number and code L/R stored in the second set of data of the fetch instruction are written in the other output packet.

A program word 302 is a program word for "2-input instruction with constant", and its constant flag CNT is "1", and its copying flag CPY is "0". The instruction code in this state is limited to a 2-input instruction. If FCP control unit 1 fetches the instruction from FCP memory 14 by addressing based on the address portion of the generation number and the node number of an input packet, an operand data pair is produced by operand data in the input packet and the fetched constant data, and a data packet storing the produced operand data pair is output. At the time, for the values of the left/operand data of the output packets, if the code L/R of the input packet is "L", the operand data of the input packet is set in the field f6 of the output packet as left operand data, while the constant data fetch from FCP memory 14 is set in the field f7 of the output packet as right operand data. Meanwhile, if the code L/R of the input packet is "R", setting of left/right operand data for the output packet is performed opposite to the above-described case of "L". For the instruction code, node number, identification L/R of the output packet, the instruction code, node number and identification code L/R of the fetched first set of data are set, respectively, and the generation number of the input packet is set for the generation number of the output packet as it is.

Thus fetching an instruction utilizing an input packet permits fetching a next order instruction as well as detection of an operand data pair of fetched constant data and the operand data of the input packet, and therefore it is not necessary to perform two fetching operations for constant data processing as practiced conventionally.

A program word 303 is a program word for "2-input instruction with constant (with copying)", its constant flag CNT and copying flag CPY are "1". The instruction code in this case is limited to a 2-input instruction. If FCP control unit 1 fetches the instruction from FCP memory 14 by addressing based on the address portion of the generation number and node number of an input packet, an operand data pair is produced by operand data in the input packet and constant data fetched from FCP memory 14, and two data packets storing the produced operand data pair are output. At that time, for the values of left/right operand data in the output packets, if the code L/R of the input packet is "L", the operand data in the input packet is set in the field f6 of each output packet as left operand data, and the constant data fetched from FCP memory 14 is set in the field f7 of each output packet as right operand data. If the code L/R of the input packet "R", setting of left/right operand data for each output packet is performed opposite to the above-described case of "L". For the instruction code of each output packet, the fetched instruction code is written. The node number, and identification code L/R stored in the first set of data of the fetched instruction are written in one of both output packets, and the node number and identification code L/R stored in the second set of data of the fetch instruction is written in the other output packet. The generation number of the input packet is set for the generation number of each output packet as it is.

Thus fetching the instruction permits two different data packets storing the same operand data pair including constant data to be produced simultaneously and output. Accordingly, two fetching operations for constant data processing and two fetching operations for copying processing as practiced conventionally are not performed.

A program word 304 is a program word for "2-input instruction", its constant flag CNT and copying flag CPY is "0", and its instruction code is a 2-input instruction. If FCP control unit 1 fetches the instruction from FCP memory 14 by addressing based on the address portion of the generation number and node number of an input packet, the state of its firing control flag VLD is first determined. If the fetched firing control flag VLD is "0", operand data and the non-address portion of a generation number in the input packet are written as queuing data and the non-address portion of the generation number in the addressing region, respectively in FCP memory 14, and a corresponding firing control flag VLD is set to "1". At the time, a data packet is not output from FCP control unit 1. If the flag VLD fetched from FCP memory 14 is "1", a determination of whether or not the non-address portion of the generation number of the input packet coincides with the non-address portion of the fetched generation number is made. If a coincidence is found, an operand data pair is produced by the operand data in the input packet and the fetched queuing data, and a data packet storing the produced operand data pair is output. At the time, for the value of left/right operand data in the output data packet, if the identification code L/R of the input packet is "L", the operand data in the input packet is set in the field f6 of the output data packet as left operand data, while the fetched queuing data is set in the field f7 of the output packet as right operand data. Meanwhile, if the code L/R of the input packet is "R", setting of left/right operand data in the output packet is performed opposite to the above-described case of "L". For the instruction code, node number, and identification code L/R of the output packet, the instruction code, node number, and identification code L/R stored in the fetch first set of data are set, respectively, and the generation number of the input packet is set for the generation number of the output packet as it is. At the same time with the packet being output, the flag VLD stored in the addressing region of FCP memory 14 is set to "0". If the non-address portion of the generation number of the input packet does not coincide with the non-address portion of the fetched generation number, the input packet has its through flag SF set to "1" and is output. The data packet with its through flag SF set to "1" is not subject to any processing in all the processing portions except FCP control unit 1 and is input once again to FCP control unit 1. When an operand data pair is produced in FCP control unit 1, the through flag SF of the input packet is set to "0" from "1", the input packet circulates without being subjected to any processing in each processing portion through the processor with its flag SW being set to "1" until an operand data pair is produced in FCP control unit 1.

A described above, the region for storing the instruction can also be used for the region for queuing an operand data pair.

Also in this embodiment, it is pointed out that as is the case with FIGS. 19A–19C, if, for example, a storage capacity larger than the product of the number of program words in a data flow program and the number of generation numbers simultaneously executable can be prepared as the storage capacity of FCP memory 14, each program word shown in FIG. 23 can be implemented by a word removed of the region for storing the non-address portion of a generation number. In this case, the size of each program word in FCP memory 14 can be reduced, it will not be necessary to write the non-address portion of the generation number of a received packet in FCP memory 14, and a coincidence detection utilizing the non-address portion of the generation number for detecting an operand data pair will not be necessary. Thus, the method of controlling execution in FCP control unit 1 will further be simplified.

FIG. 25 is a representation showing one example of an instruction implemented using a left/right attribute inverting flag SWP in the fourth embodiment.

Providing a bit for the flag SWP indicating whether or not to invert the left/right attribute of operand data stored in an input data packet to a first or second set of data of each program word shown in FIG. 23 permits an instruction to the executed as illustrated in FIG. 25. In FIG. 25, the case of "2-input instruction with constant (with copying)" in FIG. 23 is illustrated. In FIG. 25, if the values of the flags SWP provided to a node number and an identification code L/R stored in the second set of data are both "1", the left operand data and right operand data of the operand data pair of one of two packets output by fetching instruction are exchanged. If the value of the flag SWP is "0", it operates just in the same manner as the case without the flag SWP. The bit for the flag SWP is set in a position high order 1 bit of the node number of the first or second set of each program word in FIG. 23, for example. In FIG. 25, although operand data related to one of the output packets is set to be exchanged, the flag SWP may be so set that the left operand data and right operand data of both output packets may be exchanged with each other.

The structure of each program word in the abovedescribed second to fourth embodiments are decided depending upon the kinds of supportable instructions, and the width of each program word. If the program word structures of the embodiments are compared taking into account whether or not instructions shown in FIGS. 21A–21D can be supported (processed), that of the second embodiment (see FIG. 18) can support all these instructions, that of the third embodiment (see FIG. 22) can support only the instruction shown in FIG. 21A, and that of the fourth embodiment (see FIG. 23) cannot support any of the instruction shown in FIGS. 21A–21D because two different instruction codes cannot be processed with one instruction fetching. Accordingly, in view of the difference, the program word structure of the second embodiment is most preferable. Meanwhile, if program word widths are taken into account, the program word structure of the second embodiment requires the largest word width, that of the fourth embodiment requires the smallest, and therefore that of the third embodiment is most preferable. Therefore these two view points can be used as a reference in deciding which is employed among the methods of program execution shown in conjunction with the second to fourth embodiments.

As in the foregoing, according to the second to fourth embodiments, the memory space for data flow program storage and the memory space for operand data queuing are combined by FCP memory 14, only single peripheral circuitry is necessary for accessing the combined memory space as a result, the structure of the information processor can be simplified, thus reducing the number of stages of program execution processing in the processor, and therefore the speed of executing program can be increased.

Furthermore, since at least one program data is read out by a single addressing to FCP memory 14, and FCP control unit 1 can produce and output a data packet corresponding to each program data, the number of reading out program data is reduced, and therefore, time required for program execution in the processor can be reduced by the amount.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processor, comprising:

single storage means formed of a plurality of regions for storing at least one program data including instruction information and destination information constituting a data flow program, and at least one queuing data including operand data corresponding to each program data in a single memory data;

control means having an input and being operatively connected to said single storage means, for receiving at the input a data packet including a destination field storing said destination information, an instruction field storing said instruction information, and a data field, and for, based on information read out from a region of said storage means addressed by the destination information of the destination field of the received data packet, writing information from the data field of the received data packet into said addressed region as said queuing data so as to correspond to the program data previously stored at the addressed region, or producing a data packet corresponding to each program data stored in said addressed region, said control means, if a data packet is produced, storing destination information and instruction information of each program data stored in said addressed region into a corresponding destination field and instruction field in said produced data packet, respectively; storing contents of the data field of said received data packet into the data field of each produced data packet; also storing said queuing data into the data field of each produced data packet in which corresponding program data is stored, in response to said queuing data being stored in said addressed region; and outputting each produced data packet; and operation means having an output and being operatively connected to said control means to receive each produced data packet from said control means, for performing an operation processing on the contents of the data field of said received data packet according to the information stored in the instruction field of said received data packet, for storing data resulting from the performed operation processing into the data field of said received data packet, and for outputting at the output the received data packet.

2. A data driven type information processor as recited in claim 1, wherein said storage means further stores in each of the plurality of regions prescribed information related to both said program data and queuing data stored in each region, and said control means further includes first control means for receiving said data packet and for, based on said prescribed information read out from a region of said storage means addressed by the contents of the destination field of the received data packet, writing contents of the received data packet into the addressed region as said queuing data, or producing a data packet corresponding to each program data in said addressed region, said first control means, if a data packet is produced, storing destination information and instruction information of said each program data into a destination field and instruction field of a corresponding produced data packet, respectively; storing contents of the data field of the received data packet into the data field of each produced data packet; also storing each queuing data into the data field of each produced data packet storing corresponding program data, in response to said queuing data being stored in the addressed region; and outputting each produced data packet.

3. A data driven type information processor as recited in claim 2, wherein said prescribed information includes queuing information indicating whether said queuing data is valid or invalid in said corresponding region, and said first control means further includes second control means, said second control means for receiving said data packet, and for, in response to said queuing information indicating invalidity of said queuing data in said prescribed information read out from the region of said storage means addressed by the contents of the destination field of the received packet, writing the contents of the data field of the received data packet into said addressed region as said queuing data, and setting said corresponding queuing information valid, said second control means further for, in response to said read out queuing information indicating the validity of the queuing data, producing a data packet corresponding to each program data in said addressed region, storing the destination information and instruction information of said each program data in the addressed region into the destination field and instruction field of said corresponding produced data packet, respectively, storing the contents of the data field of the received packet into the data field of each produced data packet, storing each queuing data in the addressed region into the data field of each produced data packet storing corresponding program data, setting said corresponding queuing information to the state indicating corresponding queuing data is invalid, and outputting each produced data packet.

4. A data driven type information processor as recited in claim 1, wherein said data packet further stores generation information to identify said data packet, and said control means further includes first control means, said first control means for receiving said data packet, and for, based on the contents read out from the region of said storage means addressed by the contents of said destination field and said generation information of the received data packet, writing the contents of the received data packet into said addressed region as said queuing data, or producing a data packet corresponding to each program data in said addressed region, said first control means, if a data packet is produced, storing destination information and instruction information in each program data into the destination field and instruction field in said corresponding produced data packet, respectively, storing the contents of the data field of the received data packet into the data field in each produced data packet, storing each queuing data into the data field in each produced data packet storing corresponding program data, in response to said queuing data being stored in the addressed region, storing said generation information of the received data packet into each produced data packet, and outputting each produced data packet.

5. A data driven type information processor as recited in claim 2, wherein said data packet further stores generation information to identify the data packet, and said first control means further includes second control means for receiving said data packet, and for, based on said prescribed information read out from the region of said storage means addressed by the content of said destination field and said generation information in the received data packet, writing the contents of the received data packet into the addressed region as said queuing data, or producing a data packet corresponding to each program data in the addressed region, said second control means, if a data packet is produced, storing destination information and instruction information in each program data into a destination field and instruction field in a corresponding produced data packet, respectively, storing the contents of the data field of the received data packet into the data field in each produced data packet, storing each queuing data into the data field in each produced data packet storing corresponding program data, in response to said queuing data being stored in the addressed region, storing said generation information of the received data packet into each produced data packet, and outputting each produced data packet.

6. A data driven type information processor as recited in claim 3, wherein said data packet further stores generation information to identify the data packet, and said second control means further includes third control means, said third control means for receiving said data packet, and for, in response to queuing information included in said prescribed information read out from the region of said storage means addressed by the contents of the destination field and said generation information of the received data packet indicating the invalidity of said queuing data, writing the content of said data field in the received data packet into the addressed region as said queuing data, and setting said corresponding queuing information to a state meaning the corresponding queuing data is valid, said third control means further for, in response to said read out queuing information indicating the validity of the queuing data, producing a data packet corresponding to each program data in the addressed region, storing destination information and instruction information in each program data in the addressed region into the destination field and the instruction field of the corresponding produced data packet, respectively, storing the contents of the data field in the received data packet into the data field in each produced data packet, storing each queuing data in the addressed region into the data field in each produced data packet storing corresponding program data, storing said generation information of the received data packet into each produced data packet, setting said queuing information corresponding to said addressed region to indicate that the corresponding queuing data is invalid, and outputting each produced data packet.

7. A data driven type information processor as recited in claim 4, wherein said generation information includes first and second generation information, said queuing data includes queuing generation information, and said first control means further includes second control means for receiving said data packet, and for, based on the contents read out from the region of said storage means addressed by the contents of said destination field and said first generation information in the received data packet, writing said second generation information and the contents of said data field in the received data packet into the addressed region as said queuing data, or collating said queuing generation information of the addressed region and said second generation information of the received data packet, any outputting the received data packet without processing in response to non-coincidence in the collation, said second control means in response to coincidence in the collation, producing a data packet corresponding to each program data in the addressed region, storing destination information and instruction information in each program data into the destination field and the instruction field in said corresponding produced data packet, respectively, storing the content of the data field in the received data packet into the data field of each produced data packet, and the second control means, in response to said queuing data being stored in said addressed region, also storing each queuing data into the data field in each produced data packet storing corresponding program data, storing said generation information of the received data packet into each produced data packet, and outputting each produced data packet.

8. A data driven type information processor as recited in claim 5, wherein said generation information includes first and second generation information, said queuing data includes queuing generation information, and said second control means further includes third control means for receiving said data packet, and for, based on said prescribed information read out from the region of said storage means addressed by the contents of said destination field and said first generation information in the received packet, writing said second generation information and the contents of the data field in the received data packet into the addressed region as said queuing data, or collating said queuing generation information of the addressed region and said second generation information of the received data packet, outputting the received data packet without processing in response to non-coincidence in the collation, the third control means, in response to coincidence in the collation, produceing a data packet corresponding to each program data in the addressed region, storing destination information and instruction information in each program data into the destination field and instruction field in said corresponding produced data packet, respectively, storing the contents of the data field of the received data packet into the data field of each produced data packet, also storing each queuing data into the data field in each produced data packet storing corresponding program data, and the third control means in response to said queuing data being stored in the addressed region, storing said generation information of the received data packet into each produced data packet, and outputting each produced data packet.

9. A data driven type information processor as recited in claim 6, wherein said generation information includes first and second generation information, said queuing data includes queuing generation information and said third control means further includes fourth control means, said fourth control means for receiving said data packet, and for, in response to queuing information in said prescribed information read out from the region of said storage means addressed by the contents of the destination field and said first generation information of the received data packet indicating the invalidity of said queuing data, writing the contents of said data field and said second generation information of the received data packet into the addressed region as said queuing data, and setting said corresponding queuing information to indicate validity of the queuing data, said fourth control means further for collating said queuing generation information of the addressing region and said second generation information of the received packet in response to said read queuing information indicating the validity of queuing data, outputting the received data packet without processing in response to non-coincidence in the collation, and for, in response to coincidence in the collation, producing a data packet corresponding to each program data in the addressed region, storing the destination information and instruction information of each program data in the addressed region into the destination field and the instruction field in said corresponding produced data packet, respectively, storing the contents of the data field of the received data packet into the data field in each produced data packet, also storing each queuing data in the addressed region into the data field in each produced data packet storing corresponding program data, storing said generation information of the received data packet into each produced data packet, setting said queuing information corresponding to the addressed region to indicate that the corresponding queuing data is invalid, and outputting each produced data packet.

10. A data driven type information processor as recited in claim 1, wherein the data field of said data packet includes a right data field and a left data field for respectively storing right and left operands related to an operator indicated by instruction information stored in a corresponding instruction field, said data packet further including field designation information for designating one of said right data field and said left data field of the produced packet for storage of the contents of the data field, when said control means produces the data packet, and said control means further storing the contents of the data field in the received data packet into one of said right data field and said left data field in each produced data packet based on said field designation of said received data packet, and storing the corresponding queuing data in the other of the right and left data field.

11. A data driven type information processor as recited in claim 2, wherein the data field of said data packet includes a right data field and a left data field for respectively storing right and left operands related to an operator indicated by instruction information stored in a corresponding instruction field, said data packet further including field designation information for designating one of said right data field and said left data field for storage of the contents of the data field, when said first control means produces the data packet, and said first control means further storing the contents of the data field in the received data packet into one of said right data field and said left data field in each produced data packet based on said field designation information of the received data packet, and storing the corresponding queuing data in the other of the right and left data field.

12. A data driven type information processor as recited in claim 3, wherein the data field of said data packet includes a right data field and a left data field for respectively storing right and left operands related to an operator indicated by instruction information stored in a corresponding instruction field, said data packet further including field designation information for designating one of said right data field and said left data field for storage of the contents of the data field, when said second control means produces the data packet, and said second control means further storing the contents of the data field in the received data packet based on said field designation information of said received data packet into one of said right data field and said left data field of each produced data packet, and storing the corresponding queuing data in the other of the right and left data field.

13. A data driven type information processor as recited in claim 4, wherein the data field of said data packet includes a right data field and a left data field for respectively storing right and left operands related to an operator indicated by instruction information stored in a corresponding instruction field, said data packet further including field designation information for designating one of said right data field and said left data field of the produced data packet for storage of the contents of the data field, when said first control means produces the data packet, and said first control means further storing the contents of the data field in the received data packet into one of said right data field and said left data field of each produced data packet based on said field designation information of the received data packet, and storing the corresponding queuing data in the other of the right and left data field.

14. A data driven type information processor as recited in claim 5, wherein the data field of said data packet includes a right data field and a left data field for respectively storing right and left operands related to an operator indicated by instruction information stored in a corresponding instruction field, said data packet further including field designation information for designating one of said right data field and said left data field of the produced data packet for storage of the contents of the data field, when said second control means produces the data packet, and said second control means further storing the contents of the data field in the received data packet into one of said right data field and said left data field in each produced data packet based on said field designation information of said received data packet and storing the corresponding queuing data in the other of the right and left data field.

15. A data driven type information processor as recited in claim 6, wherein the data field of said data packet includes a right data field and a left data field for respectively storing right and left operands related to an operator indicated by instruction information stored in a corresponding instruction field, said data packet further including field designation information for designating one of said right data field and said left data field for storage of the contents of the data field, when said third control means produces the data packet, and said third control means further storing the contents of the data field in the received data packet into one of said right data field and said left data field in each produced data packet based on said field designation information of said received data packet, and storing the corresponding queuing data in the other of the right and left data field.

16. A data driven type information processor as recited in claim 7, wherein the data field of said data packet includes a right data field and a left data field for respectively storing right and left operands related to an operator indicated by instruction information stored in a corresponding instruction field, said data packet further including field designation information for designating one of said right data field and said left data field for storage of the data field, when said second control means produces the data packet, and said second control means further storing the contents of the data field in the received data packet into one of said right data field and said left data field in each produced data packet based on said field designation information of said received data packet, and storing the corresponding queuing data in the other of the right and left data field.

17. A data driven type information processor as recited in claim 8, wherein the data field of said data packet includes a right data field and a left data field for respectively storing right and left operands related to an operator indicated by instruction information stored in a corresponding instruction field, said data packet further including field designation information for designating one of said right data field and said left data field for storage of the contents of the data field, when said third control means produces the data packet, and said third control means further storing the contents of the data field in the received data packet into one of said right data field and left data field based on said field designation information of said received data packet and storing the corresponding queuing data in the other of the right and left data field.

18. A data driven type information processor as recited in claim 9, wherein the data field of said data packet includes a right data field and a left data field for respectively storing right and left operands related to an operator indicated by instruction information stored in a corresponding instruction field, said data packet further including field designation information for designating one of said right data field and said left data field for storage of the contents of the data field, when said fourth control means produces the data packet, and said fourth control means further storing the contents of the data field in the received data packet into one of said right data field and left data field based on said field designation information of said received data packet and storing the corresponding queuing data in the other of the right and left data field.

19. A data driven type information processor as recited in claim 11, wherein said prescribed information includes inversion instruction information for instructing inversion of contents indicated by said field designation information, and said first control means stores the contents of the data field in the received data packet and queuing data corresponding to each produced data packet in said right and left data fields in each produced data packet, based on said field designation information of said received data packet and said inversion instruction information in said addressed region.

20. A data driven type information processor as recited in claim 12, wherein said prescribed information includes inversion instruction information for instructing inversion of contents indicated by said field designation information, and said second control means stores the contents of the data field in the received data packet and queuing data corresponding to each produced data packet in said right and left data fields in each produced data packet, based on said field designation information of said received data packet and said inversion instruction information in said addressed region.

21. A data driven type information processor as recited in claim 14, wherein said prescribed information includes inversion instruction information for instructing inversion of contents indicated by said field designation information, and said second control means stores the contents of the data field in the received data packet and queuing data corresponding to each produced data packet in said right and left data fields in each produced data packet, based on said field designation information of said received data packet and said inversion instruction information in said addressed region.

22. A data driven type information processor as recited in claim 15, wherein said prescribed information includes inversion instruction information for instructing inversion of contents indicated by said field designation information, and said third control means stores the contents of the data field in the received data packet and queuing data corresponding to each produced data packet in said right and left data fields in each produced data packet, based on said field designation information of said received data packet and said inversion instruction information in said addressed region.

23. A data driven type information processor as recited in claim 17, wherein said prescribed information includes inversion instruction information for instructing inversion of contents indicated by said field designation information, and said third control means stores the contents of the data field in the received data packet and queuing data corresponding to each produced data packet in said right and left data fields in each produced data packet, based on said field designation information of said received data packet and said inversion instruction information in said addressed region.

24. A data driven type information processor as recited in claim 18, wherein said prescribed information includes inversion instruction information for instructing inversion of contents indicated by said field designation information, and said fourth control means stores the contents of the data field in the received data packet and queuing data corresponding to each produced data packet in said right and left data fields in each produced data packet, based on said field designation information of said received data packet and said inversion instruction information in said addressed region.

25. A data driven type information processor as recited in claim 1, wherein said control means includes reading means for receiving said data packet, and for addressing said storage means based upon the contents of the destination field of the received data packet, the reading means reading out said program data stored in a region corresponding to the address, field update means for producing a data packet corresponding to each program data read out by said reading means, for storing destination information and instruction information in each read out program data into the destination field and instruction field in a corresponding produced data packet, respectively, for storing the contents of the data field of the received data packet into the data field of each produced data packet, and for outputting each produced data packet, and queuing control means operatively connected to said field update means, for receiving the data packet output by said field update means and for, if the instruction information stored in the received packet is prescribed instruction information, determining whether or not said queuing data is stored in the region corresponding to said address, and reading out queuing data and storing the read out data into the data field of the received data packet and outputting the received data packet, or writing the contents of the data field of the received data packet into the region corresponding to said address as said queuing data depending upon the determination result, and the queuing control means further for, if the instruction information stored in the received data packet is not said prescribed instruction information, outputting the received data packet without processing.

\* \* \* \* \*